United States Patent
Bowen

(10) Patent No.: US 11,972,439 B2
(45) Date of Patent: Apr. 30, 2024

(54) AFFORDABLE HOUSING APPLICATION FOR REMOTE ELECTRONIC CERTIFICATION

(71) Applicant: Christyn Bowen, Perris, CA (US)

(72) Inventor: Christyn Bowen, Perris, CA (US)

( * ) Notice: Subject to any disclaimer, the term of this patent is extended or adjusted under 35 U.S.C. 154(b) by 0 days.

(21) Appl. No.: 17/903,356

(22) Filed: Sep. 6, 2022

(65) Prior Publication Data

US 2022/0414682 A1 Dec. 29, 2022

Related U.S. Application Data

(63) Continuation of application No. 17/507,047, filed on Oct. 21, 2021, now abandoned.

(60) Provisional application No. 63/180,189, filed on Apr. 27, 2021.

(51) Int. Cl.
*G06Q 30/018* (2023.01)
*G06Q 50/26* (2012.01)

(52) U.S. Cl.
CPC .......... *G06Q 30/018* (2013.01); *G06Q 50/26* (2013.01)

(58) Field of Classification Search
CPC .............................. G06Q 30/018; G06Q 50/26
See application file for complete search history.

(56) References Cited

U.S. PATENT DOCUMENTS

| | | | |
|---|---|---|---|
| 7,640,209 B1 | 12/2009 | Brooks et al. | |
| 7,860,763 B1 * | 12/2010 | Quinn | G06Q 10/10 705/30 |
| 8,073,735 B2 | 12/2011 | Libman | |
| 10,423,928 B2 | 9/2019 | Spradling et al. | |
| 2011/0246382 A1 | 10/2011 | Allen | |
| 2019/0114589 A1 * | 4/2019 | Voss | G06Q 50/163 |

(Continued)

OTHER PUBLICATIONS

Goolsbee, Austan. "The turbo tax revolution? Evaluating the ability of technology to solve the tax complexity dilemma." The crisis in tax administration (2002): 124-147 (Year: 2002).*

(Continued)

*Primary Examiner* — Carrie S Gilkey
(74) *Attorney, Agent, or Firm* — Bold IP, PLLC; Houda El-Jarrah

(57) ABSTRACT

A computer implemented application and system for providing accurate and remotely facilitated certifications of tenants eligible to participate in an affordable housing program, including federally funded and other government types affordable/low-income housing programs. The computer implemented application and system facilitates completion of all steps and elements required for multiple types of certifications, including move in certifications, interim certifications, transfer certifications, annual certifications, and move out certifications. The computer application facilitates remote certification to minimize the difficulties that have been experienced by tenants in providing documents, verifications, and correct answers to affordable housing program forms and questionnaires in person as well as any type a change occurs related to income, status, or household makeup about which the tenant has to notify the affordable/low-income housing program. The application can populate answers provided by a tenant or another party in relevant forms and questionnaires and update any required forms and documents.

12 Claims, 26 Drawing Sheets

(56) References Cited

U.S. PATENT DOCUMENTS

2021/0191963 A1\* 6/2021 Walton .................... G06F 16/34

OTHER PUBLICATIONS

Real Page Compliance Services, www.realpage.com [https://www.realpage.com/compliance-services/], date accessed: Oct. 21, 2021.

\* cited by examiner

802

CHECKLIST

Please review all the information attached. Files should be uploaded in the order the items are listed below. Please ensure that you are only uploading the required information by your program, state, and management company.

| Community name: | | Certification effective date: | |
|---|---|---|---|
| Applicant/resident name: | | Move in: | |
| Unit number: | | Recert: | |

| Tax credit, home, CDBG | Blended | HUD, RD, Public housing |
|---|---|---|
| TIC | TIC/RD/3560-8/50059/50058 | 50059/50058/rd3560-8 |
| Application | Application | Application |
| Questionnaire | Questionnaire | Questionnaire |
| Income verifications* | Income verifications | Income verifications |
| Income affidavits | Income affidavits | Income affidavits |
| Asset affidavits/verifications* | Verification of deductions | Verification of deductions |
| Income/asset calculations | Asset affidavits | Asset affidavits |
| Household affidavits** | Asset verifications | Asset verifications |
| Student affidavits | Income/asset calculations | Income/asset calculations |
| Student verifications | Household affidavits** | Household affidavits** |
| Resident release & content | Student verifications | Student affidavits |
| Verification of DOB/social, ID (all adults) (Move-In only)\*\*\* | EIV reports**** | Student verification |
| Credit/background results (Move-In only ) | HUD 9887/9887A | EIV reports**** |
| Race & ethnicity reporting form ( Move-In only )\*\*\* | Resident release & content | HUD 9887/9887A |
| Previous year TIC (annual) | HUD 92006 | HUD 92006 |
| Previous year application (annual) | Verification of DOB/social, ID (all adults) (Move-In only)\*\*\* | Verification of DOB/ social, ID (all adults) (Move-In only)\*\*\* |

FIG. 8

| | Move-In TIC or cert. (annual) | | Credit/background results (Move-In only) | | Verification of DOB/ social, ID (all adults) (Move-In only)*** |
|---|---|---|---|---|---|
| *Income affidavits include: Unemployment affidavit, zero income certification, etc. **Household affidavits include: Child support affidavit, Marital status affidavit, Court documents, etc. ***DOB: Date of birth | | | Acknowledgement of receipt, owner's & family summary | | Acknowledgement of receipt, owner's & family summary |
| | | | Race & ethnic reporting | | Citizenship form (Move-In only) |
| | | | Citizenship form (Move-In only) | | Previous TIC/RD 3560-8/ 50059/50058 (annual) |
| | | | Previous TIC/RD 3560-8/ 50059/50058 (annual) | | Previous year application (annual) |
| | | | Previous year application (annual) | | |
| | | | Move-in TIC or cert. (annual) | | |

FIG. 8(Continued)

TENANT INCOME CERTIFICATION QUESTIONNAIRE — 222
One Form per Adult Member of the Household

NAME: _____   TELEPHONE NUMBER: _____

☐ Initial Certification   BIN # _____
☐ Re-certification
☐ Other                   UNIT # _____

INCOME INFORMATION

| YES | NO | | MONTHLY GROSS INCOME |
|---|---|---|---|
| | | | (use <u>net</u> income from self-employment only) |
| 1. ☐ | ☐ | I am self-employed. (List nature of self employment) — 902 | $ _____ |
| 2. ☐ | ☐ | I have a job and receive wages, salary, overtime pay, commissions, fees, tips, bonuses, and/or other compensation: List the businesses and/or companies that pay you: — 902<br><br>Name of Employer<br>1) _____<br>2) _____<br>3) _____ | $ _____ — 904<br>$ _____<br>$ _____ — 904 |
| 3. ☐ | ☐ | I receive cash contributions of gifts including rent or utility payments, on an ongoing basis from persons not living with me. | $ _____ |
| 4. ☐ | ☐ | I receive unemployment benefits. | $ _____ |
| 5. ☐ | ☐ | I receive Veteran's Administration, GI Bill, or National Guard/Military benefits/income. | $ _____ |
| 6. ☐ | ☐ | I receive periodic social security payments. | $ _____ |
| 7. ☐ | ☐ | The household receives <u>unearned</u> income from family members age 17 or under (example: Social Security, Trust Fund disbursements, etc.). | $ _____ |
| 8. ☐ | ☐ | I receive Supplemental Security Income (SSI). | $ _____ |

FIG. 9

| | YES | NO | | | 902 | 904 |
|---|---|---|---|---|---|---|
| 9. | ☐ | ☐ | I receive disability or death benefits other than social security. | $ _____ | | |
| 10. | ☐ | ☐ | I receive public assistance income (examples: TANF, AFDC) | $ _____ | | |
| 11. | ☐ | ☐ | I am entitled to receive child support payments. | $ _____ | | |
| | ☐ | ☐ | I am currently receiving child support payments.<br>If yes, from how many persons do you receive support? _____ | $ _____ | | |
| | ☐ | ☐ | I am currently making efforts to collect child support owed to me. List efforts being made to collect child support: _____ | | | |
| 12. | ☐ | ☐ | I receive alimony/spousal support payments | $ _____ | | |
| 13. | ☐ | ☐ | I receive periodic payments from trusts, annuities, inheritance, retirement funds or pensions, insurance policies, or lottery winnings.<br>If yes, list sources:<br>1) _____ | $ _____<br>$ _____ | | |
| 14. | ☐ | ☐ | I receive income from real or personal property. | (use <u>net</u> earned income)<br>$ _____ | | |
| 15. | ☐ | ☐ | Student financial aid (public or private, not including student loans)<br>Subtract cost of tuition from aid received<br>*For Households receiving section 8 Assistance only | $ _____ | | |

ASSET INFORMATION

| | YES | NO | | INTEREST RATE | CASH VALUE |
|---|---|---|---|---|---|
| 16. | ☐ | ☐ | I have a checking account(s).<br>If yes, list bank(s)<br>1) _____<br>2) _____ | _____ %<br>_____ % | $ _____<br>$ _____ |

FIG. 9(Continued)

| | | | |
|---|---|---|---|
| 17. ☐ | I have a savings account(s)  902  If yes, list bank(s)  1) _____  2) _____ | ___%  904  ___% | $ _____  $ _____ |
| 18. ☐ | I have an EBT, Debit Visa, MasterCard account(s). (Including social security wages, Unemployment, Public Assistance, Disability, Etc...)  If yes, list sources(s) of income being received/type of accounts(s)  1) _____  904  2) _____  3) _____ | | $ _____  $ _____  $ _____ |
| 19. ☐ | I have a revocable trust(s)  If yes, list bank(s)  1) _____ | ___% | $ _____ |
| 20. ☐ | I own real estate.  If yes, provide description: _____ | | $ _____ |
| 21. ☐ | I own stocks, bonds, or Treasury bills  If yes, list sources/bank names  1) _____  2) _____  3) _____ | ___%  ___%  ___% | $ _____  $ _____  $ _____ |
| 22. ☐ | I have certificates of Deposit (CD) or Money Market Account(s).  If yes, list sources/bank names  1) _____  2) _____  3) _____ | ___%  ___%  ___% | $ _____  $ _____  $ _____ |

FIG. 10

| | | | |
|---|---|---|---|
| 23. ☐ | ☐ | I have an IRA/Lump sum pension/Keogh Account/401K.<br>If yes, list bank(s)<br>1) _____<br>2) _____ | ____%<br>____% | $ _____<br>$ _____ |
| 24. ☐ | ☐ | I have a whole life insurance policy.<br>If yes, how many policies _____ | | $ _____ |
| 25. ☐ | ☐ | I have cash on hand. | | $ _____ |
| 26. ☐ | ☐ | I have disposed of assets (i.e. gave away money/assets) for less than the fair market value in the past 2 years.<br>If yes, list items and date disposed:<br>1) _____<br>2) _____ | | $ _____<br>$ _____ |

STUDENT STATUS

| YES | NO | |
|---|---|---|
| ☐<br>☐<br>☐ | ☐<br>☐<br>☐ | Does the household consist of all persons who are <u>full-time</u> students (Examples: K-12, College, Trade school, etc.)?<br>Does the household consist of all persons who have been a <u>full-time</u> student 5 months in the current calender year?<br>Does your household anticipate becoming an all full-time student household in the next 12 months? |
| ☐<br>☐<br>☐<br>☐<br>☐ | ☐<br>☐<br>☐<br>☐<br>☐ | If you answered yes to any of the previous three questions are you:<br>• Receiving assistance under title IV of the Social Security Act (AFDC/TANF/Cal Works - not SSA/SSI)<br>• Enrolled in a job training program receiving assistance through the Job Training Participation Act (JTPA) or other similar program<br>• Married and filing (or are entitled to file) a joint tax return<br>• Single parent with a dependant child or children and neither you nor your child(ren) are dependent of another individual<br>• Previously enrolled in the Foster Care program (currently age 18-24) |

FIG. 10(Continued)

| Resource User: Juan Villa | | | | | | ↻ ⊙ |
|---|---|---|---|---|---|---|
| 1102 | 1104 | 1202 | 1108 | 1110 | 1112 | ≡ LIST ⊙ SHOW — 1114 |
| > Property Information | | | | | | |
| 🏠 Properties | PROPERTY | HOH PARTICIPANTS | FILE MANAGEMENT | E-FORMS | PENDING FORMS | Property Edit \| CERTIFICATIONS |
| ✄ HOH Participants | 1203 | 1204 | | 1206 | | 1208 ≡ ADD FILTER 1212 |
| | Name | Date | | Pertaining to | | Status 1210 |
| | > annual_recertification_04_2021 | 04/15/2021 | | Karen McRae | | Pending ✎ EDIT ☐ DELETE |
| | > initial_certification_04_2021 | 04/15/2021 | | Karen McRae | | Accepted ✎ EDIT ☐ DELETE |
| | > initial_certification_01_2021 | 01/20/2021 | | Jonathan Jandy | | Denied ✎ EDIT ☐ DELETE |
| | > unit_transfer_certification_12_2020 | 12/12/2020 | | Segun Sea | | Accepted ✎ EDIT ☐ DELETE |
| | > initial_certification_01_2021 | 01/01/2020 | | Segun Sea | | Accepted ✎ EDIT ☐ DELETE |
| | + CREATE CERTIFICATION | | | | | |
| | 💾 SAVE | | | | | ☐ DELETE |

Resource User: Juan Villa

Edit | Karina Ferrer    LIST   SHOW

1400

HOH PARTICIPANT   MEMBERS   FILE MANAGEMENT   E-FORMS   PENDING FORMS   CERTIFICATIONS

> Property Information
Properties
HOH Participants

Property Participant First Name
Karina

Property Participant Last Name
Ferrer

Property Participant Phone
41598745

Property Participant Email
karina@participant.com

Property
Lake Condos

Property Participant Unit Field
1A

Property Participant Address

Property Participant City

Property Participant State

Property Participant Postal Code

Property Participant Move In Date
03/16/2021

Property Participant Move Out Date
03/25/2021

SAVE

DELETE

> Property Information
> 
> Properties
> 
> HOH Participants

| | | | | | Edit \| Karina Ferrer |
|---|---|---|---|---|---|
| HOH PARTICIPANT | MEMBERS | FILE MANAGEMENT | E-FORMS | PENDING FORMS | CERTIFICATIONS |

1500

Name

∧ initial_certification_02_2021 — 1504    Created 02/28/2021    Pending    Status Complete    ✎ EDIT  ▢ DELETE    ⬚ ADD FILTER 1506    1508    1502    1514    1516  1516

| E-Forms | | | | | |
|---|---|---|---|---|---|
| Name | Date | Recipients | Type | Status | |
| employer_records.pdf | 03/01/2021 | Karina Ferrer, Juan Villa | employer | Complete | ◉ SHOW ✎ EDIT ▢ DELETE |
| asset_records.pdf | 03/01/2021 | Karina Ferrer, Juan Villa | assets | Complete | ◉ SHOW ✎ EDIT ▢ DELETE |
| employer_verification.pdf | 03/01/2021 | Karina Ferrer, Juan Villa | employer | Faxed | ◉ SHOW ✎ EDIT ▢ DELETE |
| assets_verification.pdf | 03/01/2021 | Karina Ferrer, Juan Villa | assets | Faxed | ◉ SHOW ✎ EDIT ▢ DELETE |
| income_questionnaire.pdf | 02/28/2021 | Karina Ferrer, Juan Villa | income | Complete | ◉ SHOW ✎ EDIT ▢ DELETE |

+ CREATE E-FORM

+ CREATE E-FORM

▢ SAVE    ▢ DELETE

FIG. 16

Resource User: Juan Villa

- Property Information
- Properties
- HOH Participants

1104 — PROPERTY  1202 — HOH PARTICIPANT  1108 — FILE MANAGEMENT  1110 — E-FORMS  1112 — PENDING FORMS  — CERTIFICATIONS — 1114

Property Edit | ≡ LIST ⊙ SHOW

⇉ ADD FILTER

| 1202 File Name | 1204 Date | 1508 Recipients | 208 Group | 1508 Type | 1502 Status | | | |
|---|---|---|---|---|---|---|---|---|
| ˅ income-questionnaire.pdf | 02/28/2021 | Karina Ferrer | initial_certification_02_2021 | Income Questionnaire | Pending | ⊙ SHOW | ✎ EDIT | ▢ DELETE |
| ˅ asset-verification.pdf | 03/01/2021 | Luis Walker | initial_certification_03_2021 | Assets Request | Action Required | ⊙ SHOW | ✎ EDIT | ▢ DELETE |
| ˅ asset-verification.pdf | 03/15/2021 | George O'Mally | Interim_certification_03_2021 | Assets Request | Faxed | ⊙ SHOW | ✎ EDIT | ▢ DELETE |
| ˅ employer-verification.pdf | 03/30/2021 | Oheyne Phillips | initial_certification_03_2021 | Employer Request | Completed | ⊙ SHOW | ✎ EDIT | ▢ DELETE |
| ˅ clarification.pdf | 03/15/2021 | Christina Yang | annual_recertification_03_2021 | Clarification | Completed | ⊙ SHOW | ✎ EDIT | ▢ DELETE |

\+ CREATE E-FORM

💾 SAVE                                                                          ▢ DELETE

| Resource User: Juan Villa | | | | Property Edit \|  ≡ LIST ⊙ SHOW |
|---|---|---|---|---|
| › Property Information | | | | |
| 🏠 Properties | PROPERTY HOH PARTICIPANT FILE MANAGEMENT E-FORMS PENDING FORMS CERTIFICATIONS | | | |
| ⚗ HOH Participants | 1203 | 1204 | 1508 | 208 ⇌ ADD FILTER |
| | Name | Date | Recipients | Group |
| | › Tenant Income Questionnaire | 02/28/2021 | Karina Ferre, Juan Villa | initial_certification_02_2021 ✎ SIGN |
| | › Tenant Income Questionnaire | 02/27/2021 | Cinthia Fraire, Juan Villa | initial_certification_02_2021 ✎ SIGN |
| | › Asset Verification | 01/20/2021 | Calliope Torres, Juan Villa | annual_recertification_01_2021 ✎ SIGN |
| | › Employer Verification | 01/15/2021 | Calliope Torres, Juan Villa | initial_certification_01_2021 ✎ SIGN |
| | › Employer Verification | 01/05/2021 | Shrek Two, Juan Villa | initial_certification_01_2021 ✎ SIGN |
| | + CREATE E-FORM | | | |
| | 💾 SAVE | | | 🗑 DELETE |

Resource User: Juan Villa

Edit | Karina Ferrer ≡ LIST ⊙ SHOW

- Property Information
- Properties
- HOH Participants

HOH PARTICIPANT   MEMBER

⟋ EDIT  ▢ DELETE

⟋ ADD FILTER

Name
∧ initial_certification_02_2021

⊙ SHOW  ⟋ EDIT  ▢ DELETE

Name
income_questionnaire.pdf

▢ DELETE

💾 SAVE

---

Show File — 1900

Name —— 1203
income-questionnaire.pdf

Type —— 1510
income

Certification group
initial_certification_02_2021

Recipients
Karina Ferrer, Juan Villa

Status
Pending

Attempt
1

Sent —— 1904
03/15/2021

Created By —— 1906
System

Created At
03/15/2021

Updated By —— 1908
System

Updated At
03/15/2021

⊗ Close

AFFORDABLE HOUSING APPLICATION FOR REMOTE ELECTRONIC CERTIFICATION

CROSS-REFERENCE TO RELATED APPLICATION

This application is a continuation-in-part of non-provisional application Ser. No. 17/507,047 filed Oct. 21, 2021, which claims priority to U.S. Provisional Patent Application No. 63/180,189 filed on Apr. 27, 2021, which is incorporated by reference in its entirety.

FIELD OF THE DISCLOSURE

The present invention relates to a new method and system for completing the certification process for affordable housing programs using a computer implemented application.

BACKGROUND

There are many different types of affordable/low-income housing programs available in the U.S. Some housing programs are federally funded and are part of federal programs. HUD is a well-known abbreviation for the U.S. Department of Housing and Urban Development, which is a federal housing agency that offers and manages a number of federally managed housing programs to assist individuals find housing with either public housing facilities or private housing facilities that participate in public/federal affordable housing programs. States may also offer their own affordable/low-income housing programs. These state-run programs may be referred to as tax credit programs or "Low-income housing tax credit programs" (LIHTC). Further, there are properties that combine federal and state housing programs and may be referred to as offering a "blended housing program."

Regardless of the type of affordable housing program, there is no doubt that the certification process needs to prove that a resident or applicant is eligible for the specific affordable housing program is a very complex, arduous, and difficult process for the residents and property managers combined. Prior to move-in, the applicant/resident must show that the application is eligible for a specific affordable housing program by completing specific questionnaires and forms from the specific affordable housing program. These specific questionnaires and forms have very specific questions that inquire about the income and assets of the individual and/or members of the household who will reside at a housing location. Many of these questionnaires and forms may have 20-100 pages, making them very long and arduous to complete. Further, the applicants/residents cannot merely answer the questions alone, but must also provide proof of their employment, income, assets, and eligibility status, which may require providing specific documents that include bank statements, paystubs, court documents related to child support and marital status, and many other types of documents.

The applicant/resident may work with compliance specialists or property managers who are professional individuals that assists the applicant/resident complete such questionnaires and forms and obtain all the necessary documents and information to complete the certification process. Property managers may also work with compliance specialists as well. Typically, the certification process requires multiple on-site, in person visits between the applicant/resident, property manager, and/or compliance specialist in multiple office locations. The applicant/resident may have to schedule several hours to sit with the property manager/compliance specialist and may have to make multiple trips to various locations, including to their employer, bank, and other locations, to request and obtain the necessary documents that must be attached to the questionnaires and forms in order to comply with a federal or state affordable housing program.

Property managers must make sure that the certification process is completed correctly for each applicant/resident of their property that is part of an affordable housing program or the property managers may face significant fines and may owe money to the government. Further, the certification process must occur every time a new resident moves in (upon move-in) who pays no rent or reduced rent as part of their inclusion in an affordable housing program and at least once a year thereafter in a recertification process. Further, some affordable housing programs offered by HUD require recertification any time there is any change to the income, assets, and other eligibility considerations of a household, which means that the recertification may occur multiple times a year for an applicant/resident. This means that an applicant/resident may have to go through the lengthy, arduous process of filling out all of the questionnaires/forms and obtain all necessary documents more than once a year. For most people, the way in which the certification process is currently completed, requiring in person, on-site visits and physical forms and documents, is a dreaded process and is considered very antiquated. The tremendous amount of time and energy spent in completing certifications by property managers to complete mass certifications for multiple applicants/residents is not insignificant. Further, for applicants/residents who are disabled, elderly, or have other considerations, it is not easy to go back and forth to the offices of their property managers and/or compliance specialists each time they have to complete a step or task for the certification process. Further, with the current crisis with the worldwide pandemic due to COVID-19, it is even harder and riskier for individuals to be required to meet together in person to complete the certification process for any affordable housing program.

Accordingly, there is a need for an improved way for applicants to an affordable housing program and property managers who manage a housing facility (e.g., apartment, home, condo, or any other type of dwelling) to complete the certification for an affordable housing program that overcomes these existing deficiencies.

SUMMARY

In one or more non-limiting embodiments, a computer implemented method is described for completing and storing any type of certification for affordable/low-income housing programs remotely. The computer implemented method may include providing access to a tenant and one or more other parties to an affordable/low-income housing program to one or more interfaces on an affordable housing application in order to complete the certification. The affordable housing application provides remote access over a network using one or more computing devices to the tenant to provide necessary information required to complete the certification, whereby the certification affirms the tenant is eligible to be a participant of the affordable/low-income housing program. Other parties in addition to the tenant can also access the one or more interfaces of the affordable housing application to complete the certification, whereby these other parties may include property management and/or staff, compliance specialists, and/or administrators of the affordable housing application. Further, program/administrators of the affordable/low-income housing programs may also be provided access to the completed certifications and may have limited privileges on the affordable housing application for purposes of auditing the completed certifications and viewing any assembled documents.

The affordable housing application may further include providing one or more interfaces and/or checklists with necessary items for completing the certification depending on a type of affordable/low-income housing program the tenant is a participant of and depending on a type of electronic certification to be completed. This may further include making the one or more interfaces and/or checklists accessible to the property management of a property where the tenant resides so that the property management is informed as to items required as stated in the one or more interfaces and/or checklists. The computer implemented method may further include providing an assembled package of one or more forms, questionnaires, and documents for the tenant and the one or more parties to access remotely, whereby the tenant is required to provide responses and answers and fill out the one or more forms, questionnaires, and documents as presented and stored in the affordable housing application. The computer implemented method may further include providing status updates about the one or more forms, questionnaires, and documents to the tenant and the one or more parties, whereby the status updates indicate whether the one or more forms, questionnaires, and documents are pending or completed or further action is required. The computer implemented method may further include providing one or more interfaces for posing comments and questions to the tenant in the affordable housing application, wherein the one or more other parties are able to make requests and respond to questions posed by the tenant in the one or more interfaces.

The computer implemented method may further include receiving any uploaded documents or other types of proof related to household makeup and income that are needed for any type of certification, as well as providing an account or record of attempts made to contact either the tenant or another party, whereby the other party may be an employer of the tenant or another individual relevant to ascertaining or determining the household makeup or the income of the tenant. The computer implemented method may further include providing completed questionnaires, forms, and the other documents with entered answers and responses obtained from the tenant and requesting signatures from the tenant and other relevant parties. The computer implemented method may further include assembling the completed questionnaires, forms, and the other documents with signatures in a completed certification for the tenant and storing the completed certification for any future auditing conducted by a representative/agent of the affordable/low-income housing program.

In another aspect, the present description includes one or more non-limiting embodiments for a system for digitally validating remote certification for an affordable/low-income housing program. In a non-limiting embodiment, the system includes a processor and a system memory coupled to the one or more processors and storing instructions configured to cause the one or more processors to implement all or part of an affordable/low-income housing application in the system memory. The system is configured to present, via the one or more processors, one or more interfaces of the affordable/low-income housing application to a tenant and one or more other parties to electronically and remotely complete any type of certification without requiring in person visits from the tenant, wherein the affordable/low-income housing application provides remote access over a network using one or more computing devices to the tenant to provide necessary information required to complete the any type of certification, wherein the one or more other parties further comprise property management and/or staff, compliance specialists, and/or administrators of the affordable/low-income housing application. The system is configured to present, via the one or more processors, a pre-compiled list of questions in an interface to the tenant, wherein the pre-compiled list of questions corresponds to a set of fillable fields for one or more questions and/or requirements for a set of documents, questionnaires, forms, or other items to be submitted for a type of certification, wherein the type of certification comprises an initial or move-in certification, an interim certification, a transfer certification, an annual certification, or a move-out certification.

Further, the system is configured to receive, via the one or more processors, answers from the tenant to the pre-compiled list of questions and to analyze, via the one or more processors, the received answers from the tenant for errors or discrepancies using a machine learning algorithm associated with the affordable/low-income housing application that is trained to detect specific types of errors or discrepancies in the received answers. Further, the system is configured to determine, via the one or more processors, whether the machine learning algorithm found or flagged any specific types of errors or discrepancies. If any specific types of errors or discrepancies are found or flagged, the system is configured to automatically notify the tenant and/or the property management and/or the staff and/or the compliance specialist, and/or the administrative entity of the affordable/low-income housing application in order to correct the received answers. Further, the system is configured to receive an updated set of tenant answers and to extract, via the one or more processors, correct answers obtained from the updated set of tenant answers. Responsive to extracting the correct answers from the updated set of tenant answers, the system is configured to automatically map and enter the correct answers to corresponding fillable fields from the set of fillable fields for the one or more questions and/or requirements for the set of documents, questionnaires, forms, or other items. Further, the system is configured to assemble a completed set of documents, questionnaires, forms, or other items to be submitted for the type of certification and to store a completed set of documents, questionnaires, forms, or other items to be submitted for the type of certification for future auditing conducted by a representative/agent of the affordable/low-income housing program.

In another aspect, the machine learning algorithm associated with the affordable/low-income housing application is trained to detect the specific types of errors or discrepancies in the received answers based in part on input and training data from an administrative entity. Further, responsive to analyzing, via the one or more processors, the received answers from the tenant for errors or discrepancies using a machine learning algorithm trained to spot specific types of errors or discrepancies, the system is configured to execute and provide a digital report listing the errors or discrepancies. Further, in a non-limiting embodiment, the digital report is electronically communicated with a compliance specialist, property manager, and/or the tenant.

Further, in a non-limiting embodiment, the system comprises determining, via the one or more processors, whether any third party verifications and third party documentation need to be provided, further comprising, automatically and electronically notifying a set of third parties of a request for the third party verifications and third party documentation. In a non-limiting embodiment, the third party verifications and the third party documentation are provided by employers of the tenant verifying employment of the tenant, by financial institutions associated with the tenant, or by legal agents or representatives of the tenant.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

FIG. 8 is a pictorial illustration of an exemplary checklist that may be included with the affordable housing application.

FIG. 9 is a pictorial illustration of a first page of an exemplary questionnaire associated with the affordable housing application.

FIG. 10 is a pictorial illustration of a second page of the exemplary questionnaire shown in FIG. 9.

FIG. 12 is a pictorial illustration of an interface for displaying and editing various types of certifications relating to specific affordable housing participants.

FIG. 13 is a pictorial illustration of an interface with comments regarding a particular questionnaire provided as part of a remote certification process.

FIG. 14 is a pictorial illustration of an interface displaying relevant information related to an affordable housing participant that is part of the affordable housing application.

FIG. 15 is a pictorial illustration of an interface displaying relevant electronic forms that may be edited by one or more parties as part of a remote certification process and that correctly identifies the type of electronic form.

FIG. 16 is a pictorial illustration of an interface displaying relevant status updates for any relevant electronic forms.

FIG. 17 is a pictorial illustration of another interface displaying relevant status and information for relevant electronic forms with the inclusion of the group type of certification.

FIG. 18 is a pictorial illustration of pending electronic forms that have been approved but still require signatures.

FIG. 19 is a pictorial illustration of relevant data pertaining to a particular file.

DETAILED DESCRIPTION

The present description is drawn to an innovative computer implemented system for completion of housing certifications electronically which can eliminate in-person certification appointments with multiple visits into the office. The system includes a third-party automated and/or manual verification process, certification automation based on a household's due date, provides 24/7 certification assistance, and stores completed electronic certifications for future reference for property management, an applicant and/or resident, a compliance specialist, and an administrator. Further details are provided below with respect to the Figures.

Figure 1:
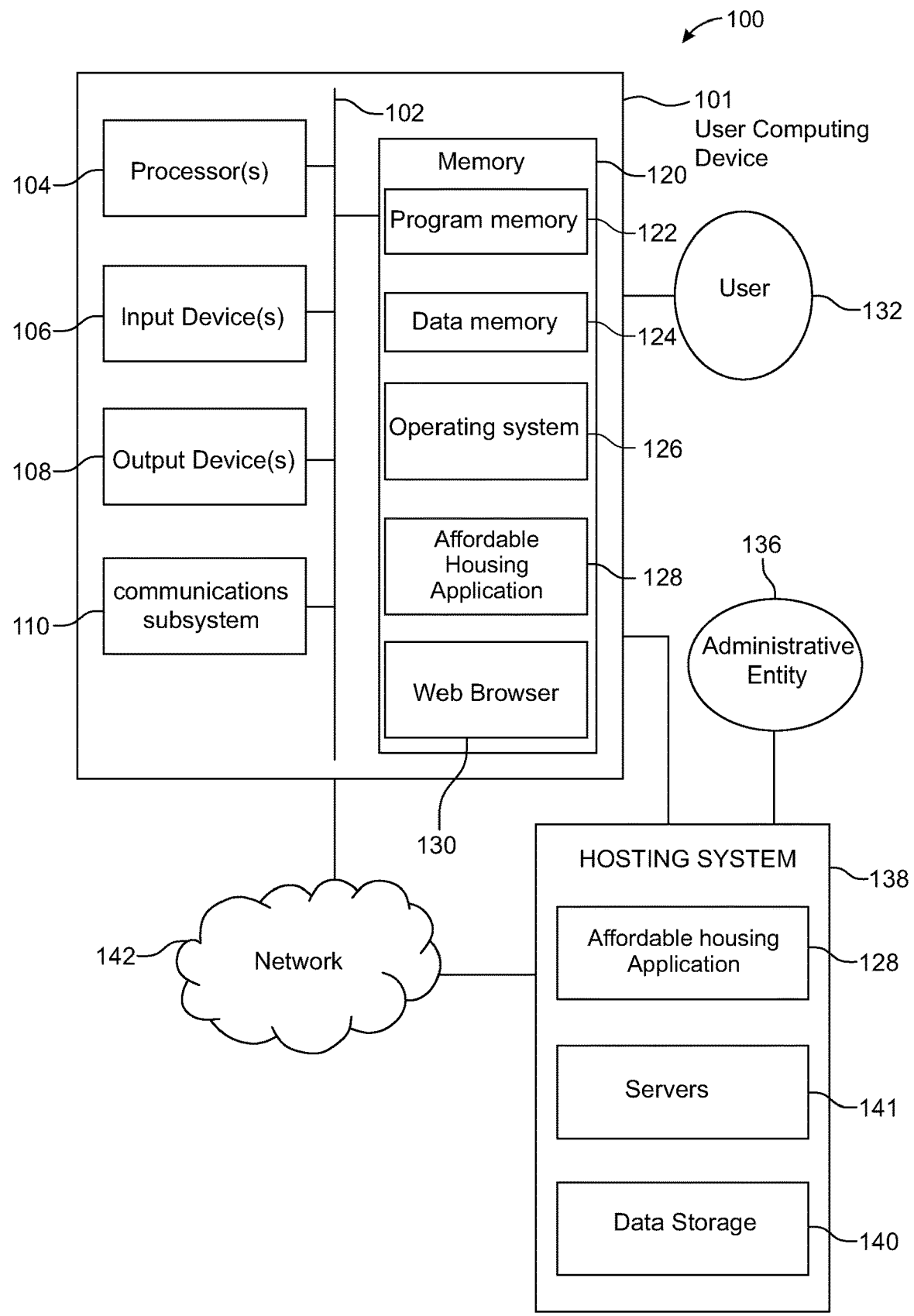
FIG. 1 depicts a block diagram that includes an exemplary computing device and components of a computer implemented system that includes a housing assistance software application in accordance with one or more illustrative embodiment.

Turning to FIG. 1, FIG. 1 illustrates an exemplary system 100 for one or more computing devices 101 and the various exemplary components that may be employed in practicing one or more non-limiting embodiments of the invention as described herein. Computing device 101 may be any type of computing device known or to be created in the future. This may include, without limitation, fixed in place computers, such as desktop computers, or mobile computing devices. Mobile computing devices may include, but are not limited to, laptop computers, smartphones, mobile phones, tablets, wearable electronic computing devices such as watches or glasses, or any other type of mobile electronic, computing device. Further, computing device 101 may include televisions that are not necessarily mobile. Such televisions may be attached to or positioned on a piece of furniture in a user 132's home or other location or may be attached to a wall or another fixture.

FIG. 1 provides a schematic illustration of one embodiment of a computing device 101 that can perform the methods provided by the various other listed embodiments, as described herein, and/or can function as the host computer system, a remote kiosk/terminal, a point-of-sale device, a mobile device, a set-top box and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

Computing device 101 may be any type of information handling system, including, but not limited to, any type of computing device as noted above. To reiterate, this may include small handheld devices, such as handheld computer/ mobile telephones or may include large mainframe systems, such as a mainframe computer. Further examples of handheld computing devices may include personal digital assistants (PDAs), personal entertainment devices, such as MP3 players, portable televisions, and compact disc players. Other examples of computing devices 101 may include, but are not limited to, laptops, notebooks, workstation computers, personal computer systems, as well as servers (e.g., servers 141). Computing devices 101 can be used by various parties described herein and may be connected on a computer network, such as computer network 142. Types of computer networks that can be used to interconnect the various information handling systems may include, but are not limited to, Local Area Networks (LANs), Wireless Local Area Networks (WLANs), the Internet (e.g., World Wide Web), the Public Switched Telephone Network (PSTN), other wireless networks, and any other network topology that can be used to interconnect the information handling systems.

The computing device 101 is shown comprising hardware elements that can be electrically coupled via a bus 102 (or may otherwise be in communication, as appropriate). The hardware elements of computing device 101 may include one or more processors 104, including without limitation one or more general-purpose processors and/or one or more special-purpose processors (such as digital signal processing chips, graphics acceleration processors, and/or the like). Computing device 101 may further include one or more input devices 106, which can include without limitation one or more cameras, sensors (including inertial sensors), a mouse, a keyboard and/or the like, which may be utilized in the implementation of affordable housing application 128.

In addition to the above, computing device 101 may include one or more output devices 108 such as the device display. Furthermore, in some embodiments, an input device 106 and an output device 108 of computing device 101 may be integrated, for example, in a touch screen or capacitive display as commonly found on mobile computing devices as well as desktop computers and laptops.

Processors 104 may have access to a memory such as memory 120. Memory 120 may include one or more of various hardware devices for volatile and non-volatile storage and may include both read-only and writable memory. For example, memory 120 may comprise random access memory (RAM), CPU registers, read-only memory (ROM) and writable non-volatile memory, such as flash memory, hard drives, floppy disks, CDs, DVDs, magnetic storage devices, tape drives, device buffers, and so forth. A memory 120 is not a propagating signal divorced from underlying hardware; a memory is thus non-transitory. Memory 120 may include program memory such as program memory 122 capable of storing programs and software, such as an operating system such as operating system 126, affordable housing application 128, and other computerized programs or application programs. Memory 120 may also include data memory such as data memory 124 that may include database query results, configuration data, settings, user options or preferences, etc., which may be provided to program memory 122 or any element of computing device 101.

The computing device 101 may further include (and/or be in communication with) one or more non-transitory storage devices, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein. Further, the storage devices may be non-volatile data storage devices in one or more non-limiting embodiments. Further, computing device 101 may be able to access removable nonvolatile storage devices that can be shared among two or more information handling systems (e.g., computing devices) using various techniques, such as connecting the removable nonvolatile storage device to a USB port or other connector of the information handling systems.

The computing device 101 might also include a communications subsystem 110, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 110 may permit data to be exchanged with a network (e.g., such as network 142), other computer systems, and/or any other devices.

The computing device 101 or system 100 also can comprise software elements, shown as being currently located within the memory 120, which in some instances may include an operating system 126, device drivers, executable libraries, and/or other code, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt computing device 101 to perform one or more operations in accordance with the described methods.

A set of these instructions and/or code might be stored on a computer-readable storage medium, such as the storage device(s) described above. In some cases, the storage medium might be incorporated within a computer system, such as computing device 101. In other embodiments, the storage medium might be separate from computing device 101 (e.g., a removable medium, such as a compact disc or USB stick), and/or be provided in an installation package, such that the storage medium can be used to program, configure, and/or adapt a general-purpose computer with the instructions/code stored thereon. These instructions might take the form of executable code, which is executable by the computing device 101 and/or might take the form of source and/or installable code, which, upon compilation and/or installation on the computing device 101 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computing system 100) to perform methods in accordance with the disclosure. For example, some or all of the procedures of the described methods may be performed by the computing device 101 in response to one or more processors 104 executing one or more sequences of one or more instructions (which might be incorporated into the operating system 126 and/or other code contained in the memory 120). Such instructions may be read into the memory 120 from another computer-readable medium, such as one or more of the storage devices. Merely by way of example, execution of the sequences of instructions contained in the memory 120 may cause the one or more processors 104 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 101, various computer-readable media might be involved in providing instructions/code to the one or more processors 104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks which may be an example of storage devices. Volatile media may include, without limitation, dynamic memory, which may be a type of memory included in memory 120. Transmission media may include, without limitation, coaxial cables, copper wire and fiber optics, including the wires that comprise the bus 102, as well as the various components of the communications subsystem 110 (and/or the media by which the communications subsystem 110 provides communication with other devices). Transmission media can also take the form of waves (including without limitation radio, acoustic, and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 110 (and/or components thereof) generally will receive the signals, and the bus 102 then might carry the signals (and/or the data, instructions, etc. carried by the signals) to the memory 120, from which the one or more processors 104 retrieves and executes the instructions. The instructions received by the memory 120 may optionally be stored on a non-transitory storage device either before or after execution by the processor(s) 104.

In one or more embodiments, computing device 101 is in communication with one or more networks, such as network 142. Network 142 may include a local area network (LAN), such as a company Intranet, a metropolitan area network (MAN), or a wide area network (WAN), such as the Internet or World Wide Web. Network 142 may be a private network, a public network, or a combination thereof. Network 142 may be any type of network known in the art, including a telecommunications network, a wireless network (including Wi-Fi), and a wireline network. Network 142 may include mobile telephone networks utilizing any protocol or protocols used to communicate among mobile digital computing devices (e.g., computing device 101), such as GSM, GPRS, UMTS, AMPS, TDMA, or CDMA. In one or more non-limiting embodiments, different types of data may be transmitted via network 142 via different protocols. In further non-limiting other embodiments, computing device 101 may act as a standalone device or may operate as a peer machine in a peer-to-peer (or distributed) network environment.

Network 142 may further include a system of terminals, gateways, and routers. Network 142 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

In one or more non-limiting embodiments, a computing device, such as computing device 101 may include a web browser such as web browser 130. Web browser 130 may be any type of web browser known in the art that may be used to access one or more web applications (e.g., affordable housing application 128) on user computing devices 101 or the like. Web applications are applications that are accessible by network 142 and may be located on the Internet or World Wide Web. Web browser 130 may include a variety of hardware, software, and/or firmware generally operative to present a web application to a user via a display device 108 (e.g., touchscreen or other type of monitor or display device) on a computing device. Examples of suitable web browsers include, but are not limited to, MICROSOFT EXPLORER, MOZILLA FIREFOX, and APPLE SAFARI. Web browser 130 may be previously installed by the manufacturer or company associated with the computing device 101, or alternatively, may be downloaded onto computing device 101 or any other computing device. Web browser 130 may be stored in a separate storage device and/or memory 120.

Figure 2:
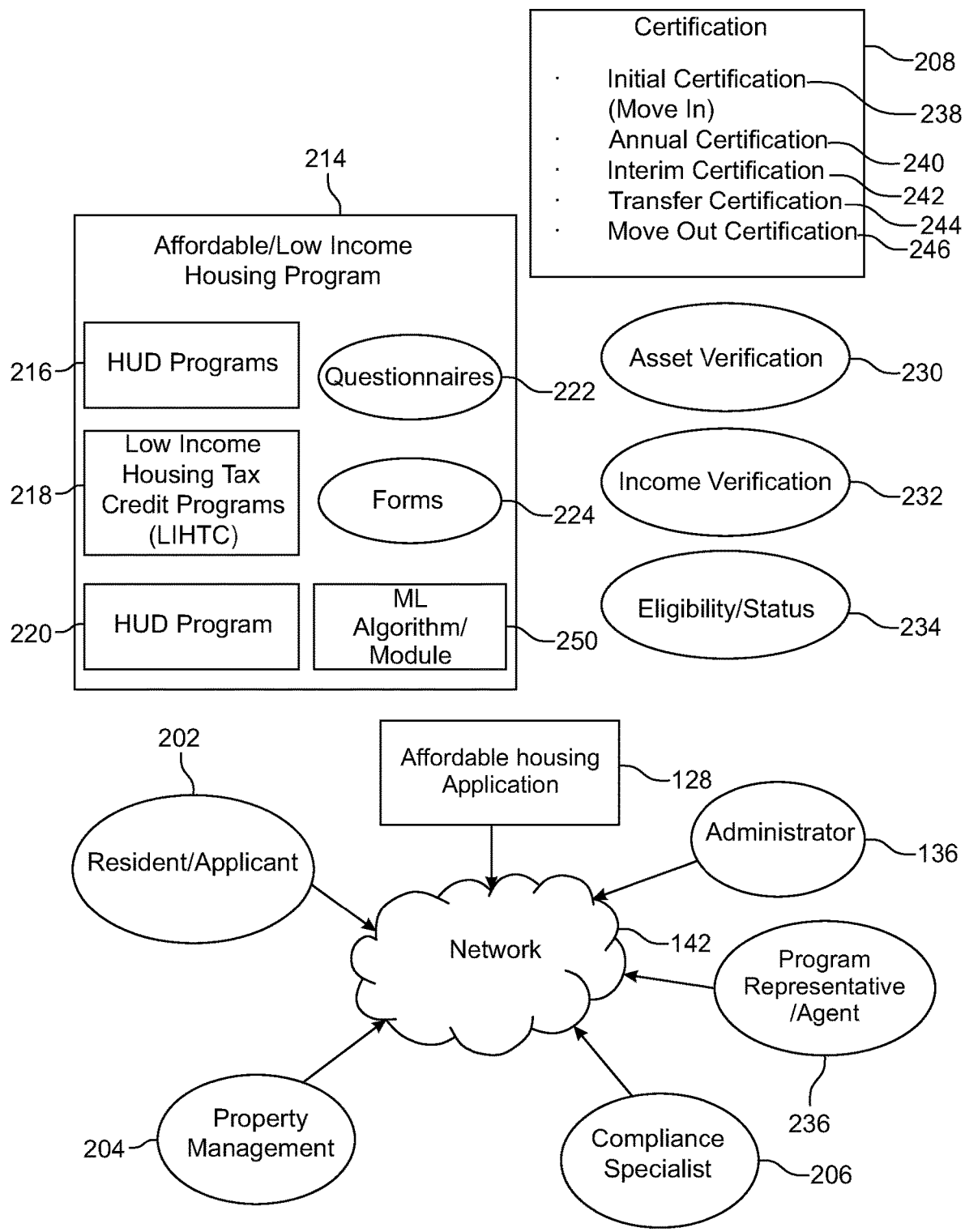
FIG. 2 depicts a block diagram of users and components of a system utilizing the housing assistance software application.

In one or more non-limiting embodiment, affordable housing application 128 may be a software program or module configured to allow a user 132 to complete one or more certification processes remotely and electronically. Accordingly, affordable housing application 128 allows a user 132 to upload all required affordable housing program documents to complete certification (as further explained below and shown in FIG. 2) electronically (i.e., through the affordable housing application 128). Affordable housing application 128 may be particularly useful for completing certifications, and specifically electronic certifications, for applicants/residents 202 (e.g., as shown in FIG. 2) who reside at an apartment or other facility that is part of an affordable housing program (e.g., low-income housing programs) regardless of whether the affordable housing program is a federal or state housing program. Affordable housing application 128 may be accessible by applicant/ resident 202, as shown in FIG. 2, property management 204, compliance specialists 206, and administrators/administrative entity 136 individuals.

In one or more non-limiting embodiments, affordable housing application 128 may be implemented as a downloadable program or application storable on user computing device 101 for easy accessibility and viewability. Affordable housing application 128 may alternatively be implemented as a web service that is designed to implement a set of tasks that is accessible from multiple computing devices, such as computing device 101 over a network, such as network 142. In particular, affordable housing application 128 may be implemented as a web service accessible using the World Wide Web as the connecting network 142, although any alternative type of network may be used, including cellular networks. Accordingly, user 132 may download affordable housing application 128 on user 132's computing device 101 and use the input devices 106 of the computing device 101 to enter data pertinent to the user's housing application for affordable housing application 128. The display screen, which is one of the output devices 108 of the user computing device 101, may display any pertinent forms, images, instructions, and fields viewable in the affordable housing application 128, as further explained below.

A user 132 may invoke a series of web service calls via requests to one or more servers 141 that are part of the hosting system 138 which would host affordable housing application 128. In one or more non-limiting embodiments, hosting system 138 may be a cloud-based type hosting system. "Cloud-based" is a term that refers to applications, services, or resources (e.g., affordable housing application 128) made available to users on demand via a network, such as network 142, from a cloud computing provider's server. Administrative entity 136 may be the cloud computing provider and may use servers 141 to provide access to data storage 140 and other systems that work in conjunction with the operation and maintenance of affordable housing application 128.

Hosting system 138 may include data storage systems 140 that can provide access to stored data by applications running on computing devices, such as computing device 101, that may be geographically separate from each other, provide offsite data backup and restore functionality, provide data storage to a computing device with limited storage capabilities, and/or provide storage functionality not implemented on computing device 101.

The hosting system 138 may be a service that can be implemented as a web service, in one or more non-limiting embodiments, with a corresponding set of Web Service Application Programming Interfaces (APIs). The Web Service APIs may be implemented, for example, as a Representational State Transfer (REST)-based Hypertext Transfer Protocol (HTTP) interface or a Simple Object Access Protocol (SOAP)-based interface. Any programming languages may be used to create or operate affordable housing application 128 as a web service, including, but not limited to .Net, Java, and XML. Further, affordable housing application 128 as a web service may use standardized industry protocol for the communication and may include well-defined protocols, such as Service Transport, XML Messaging, Service Description, and Service Discovery layers in the web services protocol stack.

The hosting system 138 can be implemented such that client applications (for example, executing on computing device 101) can store, retrieve, or otherwise manipulate data objects in the hosting system 138. The hosting system 138 can be implemented by one or more server devices 141, which can be implemented using any type of computing device.

In one or more non-limiting embodiments, administrative entity 136 is the provider and creator of affordable housing application 128. Administrative entity 136 may make affordable housing application 128 available to any client or user, such as user 132, who wants to use the features of affordable housing application 128. Administrative entity 136 may be able to manipulate and alter affordable housing application 128 remotely so as to affect the operation and maintenance of affordable housing application 128 on server(s) 141 and as stored on one or more data storage devices 140 that are part of the hosting system 138. While administrative entity 136 is depicted as a single element communicating over network 142 and through the hosting system 138, it is noted that administrative entity 136, in one or more non-limiting embodiments, may be distributed over network 142 in any number of physical locations.

In one or more non-limiting embodiments, affordable housing applications 128 may be a downloadable software module that is capable of being downloaded and stored directly on a computing device, such as computing device 101, and/or accessible from the cloud or other system via network 142. Accordingly, any user may be able to download affordable housing application 128 on computing device 101 as a computer-based application and software module that runs using the working engines and modules on the computing device 101. In some embodiments, affordable housing application 128 may be preinstalled on computing device 101 or any other computing device by the manufacturer, designer, or other entity. Affordable housing application 128 may be innate, built into, or otherwise integrated into existing platforms such as, without limitation thereto, a website, third-party program, iOS™, Android™, Snapchat™, Getty Images™, Instagram™, Facebook™, or any other platform capable of transmitting, receiving, and presenting data.

Affordable housing application 128 may be stored on computing device 101 and may also be stored or otherwise accessible by one or more servers 141 over network 142 by any party. The storage devices may include a non-transitory computer readable medium including instructions, which when executed by a computer or processor (such as processors 104) may cause the computer or processor to perform operations to implement affordable housing application 128. Further information about other components of affordable housing application 128 are included below with respect to the Figures.

FIG. 2 shows a pictorial illustration of various components of system 100 which includes affordable housing application 128. Affordable housing application 128 may be utilized by multiple parties and will aid in the certification 208 process required for ensuring that residents/applicants 202 at an affordable housing facility are eligible for that specific type of affordable housing program 214 and are in compliance with the affordable housing program 214 guidelines. The term "affordable housing" may interchangeably be used with the term "low-income" throughout this description. Affordable housing application 128 may also be very useful to property management 204 to ensure that their applicants/residents 202 are eligible and in compliance as well with the affordable housing programs 214. Property management 204 can face significant fines and owe money to the government as well as the actual residents 202 themselves if their residents 202 do not comply with the certification 208 process and provide all the necessary accurate documentation to fulfill the requirements of the certification 208 process to qualify and remain eligible for certification 208.

Some of the parties that may benefit from using and accessing affordable housing application 128 may be resident/applicant 202, property management 204, compliance specialist 206, administrator 136, and affordable housing representative/agent 236. In one or more non-limiting embodiments, these parties 202, 204, 206, 136, 236 as shown in FIG. 2 may access the affordable housing application 128 as a web service software provided over and accessible from any computing device 101 over network 142 for various purposes. Each party, such as, but not limited to, the resident/applicant/HUD property participant 202, property management representative 204, compliance specialist 206, administrator 136 of the affordable housing application 128, and affordable housing representative/agent 236 may have various reasons for accessing and using affordable housing application 128 with respect to the remote and electronic certification process 208. Alternatively, affordable housing application 128 may be downloaded and stored as a software program on the user computing device 101. FIGS. 4-19 illustrate some of the various features and functions offered by affordable housing application 128 to resident/applicant 202, property management representative 204, compliance specialist 206, and administrator 136, and the affordable housing representative/agent 236.

Resident/applicant 202 as used herein refers to the applicant or tenant of a particular affordable/low-income housing program 214. The applicant may also be referred to as a resident, as shown in FIG. 2, because the applicant will be the party residing in one or more property locations or affordable housing units. The term "resident" or "applicant" as used herein may interchangeably be referred to as "tenant."

Property management 204 refers to the parties that may manage and run any type of residential facility, complex, or location, whether the residence is a house, apartment, condo, or some other type or category of residential location. Property management 204 may include the leasing managers and any staff working for a property or who may own a property. Property management 204 may include private and public landlords.

Compliance specialist 206 may refer to any individual who is specialized and qualified in making sure the resident/applicant 202 is in compliance with any requirements of a particular affordable/low-income housing program 214 and in compliance with the certification 208 process for the affordable/low-income housing program 214. The compliance specialist 206 may be knowledgeable in many issues related to any eligibility guidelines, rent calculations, income and asset guidelines, allowances and adjusted income guidelines, verifying eligibility, billing, screening guidelines, re-certification, claims and fraud, and any guideline changes, such as income calculations and reporting procedures. A compliance specialist 206 may be any individual qualified in such considerations for ensuring an applicant/resident 202 and property management 204 are in compliance with the certification 208 guidelines for each program of the affordable/low-income housing programs 214. In some cases, property management 204 may prefer to work with a compliance specialist 206 rather than undertaking to ensure compliance on their own. In some cases, the compliance specialist 206 may be an employee or contractor hired by property management 204 to ensure the guidelines for the affordable/low-income housing program 214 are being complied with.

The administrator 136 is part of the administrative entity 136 team as shown in FIG. 1 that manages and operates affordable housing application 128 on behalf of its users, such as, but not limited to, the resident/applicant 202, property management 204, and compliance specialist 206. Administrator 136 may have special administrative privileges that enable the administrator 136 to add or edit any accounts or profiles for any user, including resident/applicant 202, property management 204, and compliance specialists 206.

The affordable housing representative/agent 236 may be the individual representing an affordable/low-income housing program 214, regardless of whether the affordable/low-income housing program 214 is entirely run by a government agency or a private agency or a combination thereof. Advantageously, the affordable housing representative/agent 236 may remotely view and audit any documents or other items related to one or more certifications 208, in particular, completed certifications in any of the groups or categories shown in FIG. 2 including, but not limited to, an initial certification 238, an annual certification 240, an interim certification 242, a transfer certification 244, and a move out certification 246, which are further explained below.

There are various categories or types of certifications 208. An initial certification 238 may occur when a resident/applicant 202 first or initially moves into an affordable housing location and is eligible to participate in an affordable/low-income housing program 214. An annual certification 240 is usually required each year and may be at a particular time/set time in order to ensure that the resident/applicant 202 is still eligible and qualifies to be enrolled in an affordable/low-income housing program 214. Each year, tenants (i.e., resident/applicant 202) must re-certify that their information is correct and consistent as first stated on their initial application forms. Examples of important factors that must be considered in order to determine if a resident/applicant 202 is still eligible for an affordable/low-income housing program 214 may include the resident 202's current income and family composition. These aspects may affect which unit a resident/applicant 202 is eligible to live in at a specific property. Annual re-certifications 240 are required by law, and if are not completed, the property management 204 may face steep fines and penalties. If the resident/applicant 202 does not willingly participate in the annual re-certification 240 (or any type of certification 208), the resident/applicant 202 can be evicted.

Transfer certification 244 may be a certification to transfer a resident/applicant 202 to another affordable housing/low-income housing program 214. Move out certification 246 is a type of certification 208 that must occur when an applicant/resident 202 moves out of an affordable housing/low-income housing location.

It is therefore understandable that there are many tasks a property manager 204 and/or tenant 202 must undertake to comply with the legal requirements for eligibility and compliance for any particular affordable/low-income housing program 214. Further, because there are at least five different types of certifications, including but not limited to initial certification 238, annual certification 240, interim certification 242, transfer certification 244, and move out certification 246, that have their own forms, questionnaires, status updates, and secondary documents that may need to be submitted by certain deadlines and timelines for all of the various tenants 202, it can become an overwhelming and time consuming process to keep up with the rules and regulations for such certification 208 procedures. Further, the current system does not allow for remote certification 208. Rather, the tenants 202 must meet in person with any property management employees and/or staff 204 and/or compliance specialists 206 to sign forms 224 or questionnaires 222 or other documents necessary to complete any type of certification 208, which puts additional burden on the tenant 202 and other individuals to find the time and manage resources to travel to and from the meeting site to meet with the property management employees and/or staff 204 or compliance specialists 206. As noted elsewhere, compliance specialists 206 are frequently hired or consulted by property management 204 to ensure that the certification process for any type of certification 208 is performed correctly and properly and in compliance with legal requirements for the relevant type of affordable/low-income housing program 214.

The affordable/low-income housing programs 214 shown in FIG. 2 may include, but are not limited to, HUD programs 216, low-income housing tax credit programs (LIHTC) 218, and blended programs 220. "HUD" may be an acronym for the Department of Housing and Urban Development, which is a government agency focused on housing.

Most affordable/low-income housing programs 214 are government programs that are provided for and administered by a government agency, including federal and state government. These affordable/low-income housing programs 214 have a variety of rules and guidelines to ensure the residents/applicants 202 who receive the benefits of affordable housing through their programs 214 are eligible and in compliance with all of the stringent requirements. Most of these affordable/low-income housing program 214, including HUD programs 216, LIHTC programs 218, and blended programs 220, have their own set of questionnaires 222 and forms 224 that must be filled out and met in for any resident/applicant 202 to qualify. As noted above, these questionnaires 222 and forms 224 may be numerous pages of tough questions and statements that the resident/application 202 has to provide. It may be difficult for a tenant/applicant 202 to understand the true meaning behind each question included on the questionnaires 222 and forms 224, and there may be a great deal of time spent back and forth (frequently in person) between the tenant/applicant 202 and either the property management 204 or compliance specialist 206 to answer any questions the tenant/applicant 202 may have. In addition to the questionnaires 222 and forms 224, there may be many other types of documents that have to be submitted, including personal identification, proof of citizenship, and evidence of one's income and assets and other criteria to qualify for an affordable/low-income housing program 214. Further, these additional documents that may need to be attached to these questionnaires 222 and forms 224 that the resident/applicant 202 may have to supply, such as, but not limited to, bank statements, pay stubs, court documents, and many other kinds of documents support statements of the resident/applicant 202. FIG. 9 and FIG. 10 provide an example of a questionnaire 222 that a resident/applicant 202 must complete for most affordable/low-income housing programs 214. The first and second pages of questionnaire 222 shown in FIG. 9 and FIG. 10 is an exemplary questionnaire that includes multiple and real questions and/or statements requesting confirmation 902 that the user has to fill out in order to comply with a certification process 208 including a recertification or annual certification 240. The questionnaire 222 shown in FIGS. 9 and 10 is the "Section 8/236-LIHTC Combo" questionnaire and contains useful questions (e.g., 902) that would be utilized by multiple affordable/low-income housing programs 214 that include fillable spaces and/or fields 904. This form and sample packet is at least 47 pages long and must be filled out for each certification 208. The questionnaire 222 includes extensive questions about asset information, income information, student status, family status, and more, requiring the applicant/resident 202 or other individual filling out the questionnaire 222 to have a thorough understanding of all of these matters. Further, the questionnaire 222 includes multiple forms that the applicant/resident 202 has to sign, including other members of the household (anyone over 18), meaning that multiple parties have to provide signatures in order for the certification 208 to be complete. Advantageously, affordable housing application 128 is a computer-implemented system and application that allows the many individuals who play a role in the certification 208 process (e.g., tenant 202, property management 204, compliance specialist 206, administrators 136 of the affordable housing application 128) to ensure, in a remote manner using computing devices 101, that the multiple pages and types of questionnaires 222, forms 224, and other verifying documents (e.g., to prove and verify assets 230, income 232, and eligibility 234) are correctly filled out, signed, and stored for auditing or examination by an affordable housing representative/agent 236.

HUD programs 216 are usually affordable housing programs administered and offered through the Department of Housing and Urban Development and may be a federally based program. LIHTC programs 218 are usually affordable housing programs administered and offered by various government agencies through a resident/applicant's 202 state. Blended programs 220 may be a type of affordable housing program that combines elements of the HUD program 216 and the LIHTC program 218.

As noted above, the certification 208 process and procedures for each type of affordable/low-income housing program 214 must occur upon move-in 238 for each resident/applicant 202 in any particular unit (e.g., apartment or housing). As noted above, the initial certification or move-in certification 238 refers to the initial certification that a resident/applicant 202 has to complete upon first moving into a housing facility or unit that is sponsored or included under any type of affordable/low-income housing program 214, including, but not limited to HUD programs 216, LIHTC programs 218, and blended programs 220. The move-in 238 certification process is the first certification process that occurs when a resident/applicant 202 moves into a specific facility.

Certification 208 further entails recertification, which includes annual certification 240 in which the resident/applicant 202 has to recertify at least once a year. Recertification or annual certification 240 requires the resident/applicant 202 to fill out the same or any updated questionnaires 222 and forms 224 and provide all supporting documents as to the resident/applicant 202's eligibility for a particular type of affordable/low-income housing program 214. Certification 208 is the process of ensuring asset verification 230, income verification 232, and eligibility/status 234 checks for any resident/applicant 202 seeking to qualify for any program of the affordable/low-income housing program 214.

Further, HUD programs 216 require the resident/applicant 202 to recertify any time there is a change to the resident/applicant's 202 income over a threshold amount. For example, current guidelines require a resident/applicant 202 of a HUD program 216 to complete the recertification process any time there is a change to the resident/applicant's 202 income. This means that the resident/applicant 202 must be sure to fill out all of the questionnaires 222 and forms 224 or other necessary documentation in the correct manner and provide all the necessary attachments and evidence supporting the statements of the resident/applicant 202.

Once all of the necessary documents and questionnaires 222 and forms 224 have been fully and correctly filled out and any additional attachments provided, a completed certification may be provided to the relevant agency 236 managing any of the affordable/low-income housing programs 214 or may be stored for future reference and future audits by the agency administrators 236 associated with each type of affordable/low-income housing program 214. In a non-limiting embodiment, any completed certifications 208 may be stored with property management 204, which is usually audited at least once a year by the administrators/agents 236 of the affordable/low-income housing program 214. Further, the resident/applicant 202 may keep and store a copy of the completed certification 208.

It is difficult for any resident/applicant 202 to understand fully all the guidelines and requirements to comply with the certification 208 process for each type of affordable/low-income housing program 214, which is why most resident/applicants 202 may turn to the representative individuals of their property management 204 and/or compliance specialists 206 for help in filling out the necessary questionnaires 222 and forms 224. Further, currently, the resident/applicant 202 and property management 204 and/or compliance specialist 206 all have to meet usually multiple times in person to complete the questionnaires 222 and forms 224 for each program of the affordable/low-income housing program 214. Further, there are many specific deadlines and dates that property management 204 must be sure to meet in terms of providing notice of the certification 208 or recertification 240 process.

Advantageously, affordable housing application 128 allows the resident/applicant 202 the ability to provide all necessary information for certification 208, whether for a move-in certification 238 process or recertification (e.g., annual certification 240), remotely and/or through the resident/applicant 202's computing device (e.g., computing device 101 shown in FIG. 1). The term "remote certification" may also interchangeably be used herein to mean "electronic certification." The property management 204 and compliance specialist 206 may also beneficially log onto and enter any necessary information or edit any information provided by the resident/applicant 202 by accessing the affordable housing application 128.

Further, as further explained with respect to FIGS. 3-19, the affordable housing application 128 is configured to provide detailed answers and explanations for any items or questions contained in any questionnaire 222, form 224, or other items requested by the affordable housing application 128 to complete a certification 208. Further, the affordable housing application 128 provides tutorials and help related articles that may benefit the resident/applicant 202, property management 204, and compliance specialist 206 when responding to any due dates, deadlines, or answering any questions in the affordable housing application 128.

In one or more non-limiting embodiments, the affordable housing application 128 is a software program or service that can map any obtained information or answers from the resident/application 202, property management 204, and/or compliance specialist 206 and fill out corresponding fields or questions in one or more questionnaires 222 or forms 224 for each type of affordable/low-income housing program 214. For example, the affordable housing application 128 may prompt the resident/applicant 202 or another party to provide answers to questions that may provide answers for questionnaire 222 (e.g., Section 8/236-LIHTC Combo) as shown in FIG. 9. The affordable housing application 128 may extract the answers provided from the resident/applicant 202 and map the answers to the fillable fields and entries of questionnaires 222 and any other forms 224 needed for resident/applicant 202 to comply with the certification 208 process. Accordingly, the affordable housing application 128 can map the answers and information provided from the resident/applicant 202 or any other party to the specific questionnaires 222 and forms 224 that must be completed as part of the certification 208 process.

In a non-limiting embodiment, the affordable housing application 128 includes a machine learning (ML) algorithm 250. The ML algorithm or module 250 can be trained to spot errors or discrepancies 2206, as further explained with respect to FIG. 22 below.

Figure 3:
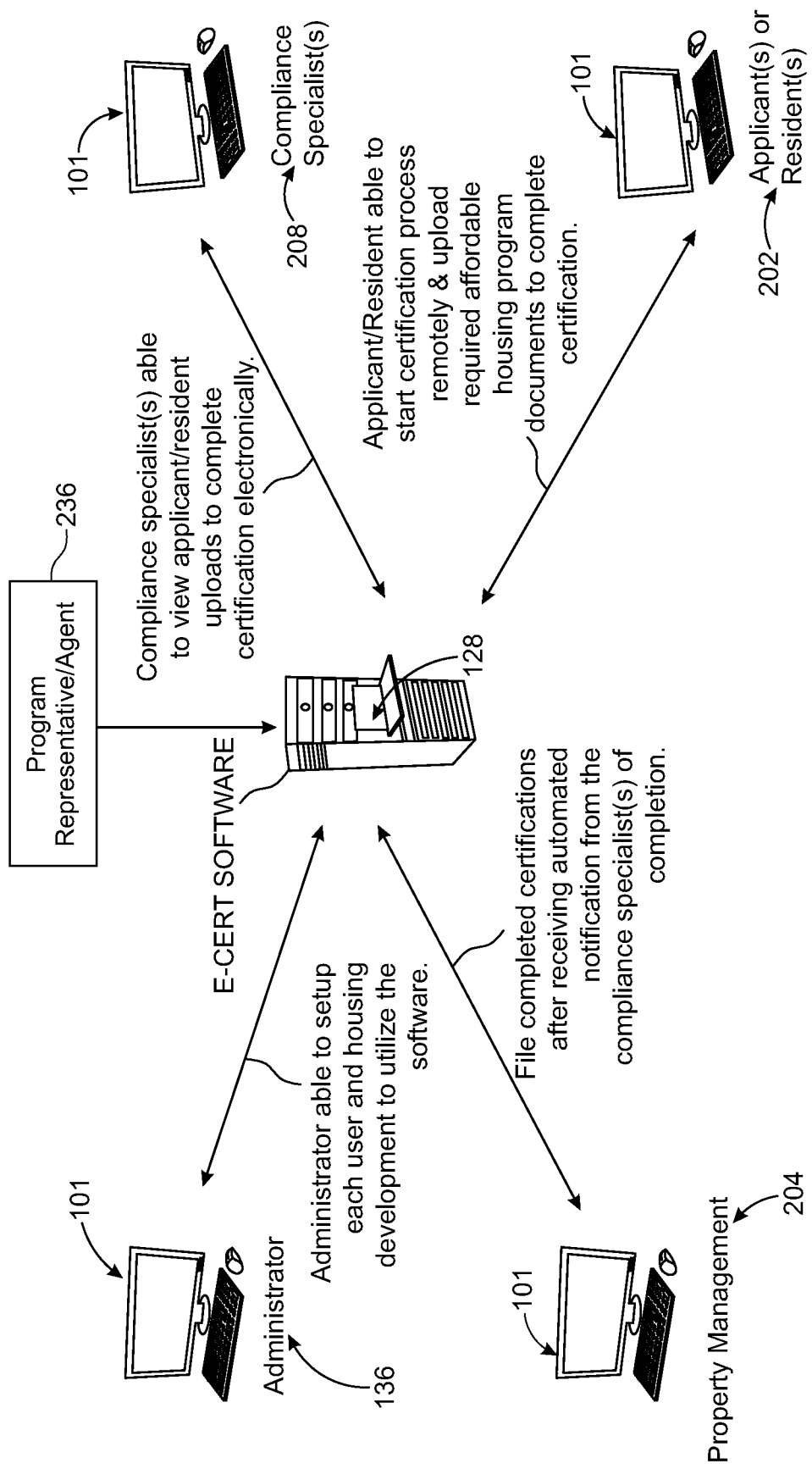
FIG. 3 depicts a pictorial illustration of users of the system utilizing the housing assistance software application.

FIG. 3 shows a pictorial illustration of how the various parties mentioned above in FIGS. 1-2, including but not limited to resident/application 202, property management 204, administrator 136, and compliance specialist 206 can utilize the affordable housing application 128. As shown in FIG. 3, The resident/applicant 202 may be able to start the certification process remotely/electronically via the affordable housing application 128 and to upload any required affordable housing program 214 documents to complete certification 208. In one or more non-limiting embodiments, the administrator 136 may be able to set up each user and housing development (e.g., property belonging to property management 204) to utilize the housing assistance software application 128. The agents of the property management 204 are able to view any uploads provided by the resident/application to complete certification electronically. Further, the property management 204 may be able to complete certifications 208, for example, after receiving automated notifications from the compliance specialist 206 of completion.

As shown in FIG. 3, the compliance specialist 206 may be able to view resident/applicant 202 uploads to complete the certification 208 process electronically. Any of these parties 202, 204, 206, 136 may use their own individual computing devices 101 to access the housing assistance software application 128.

Figure 4:
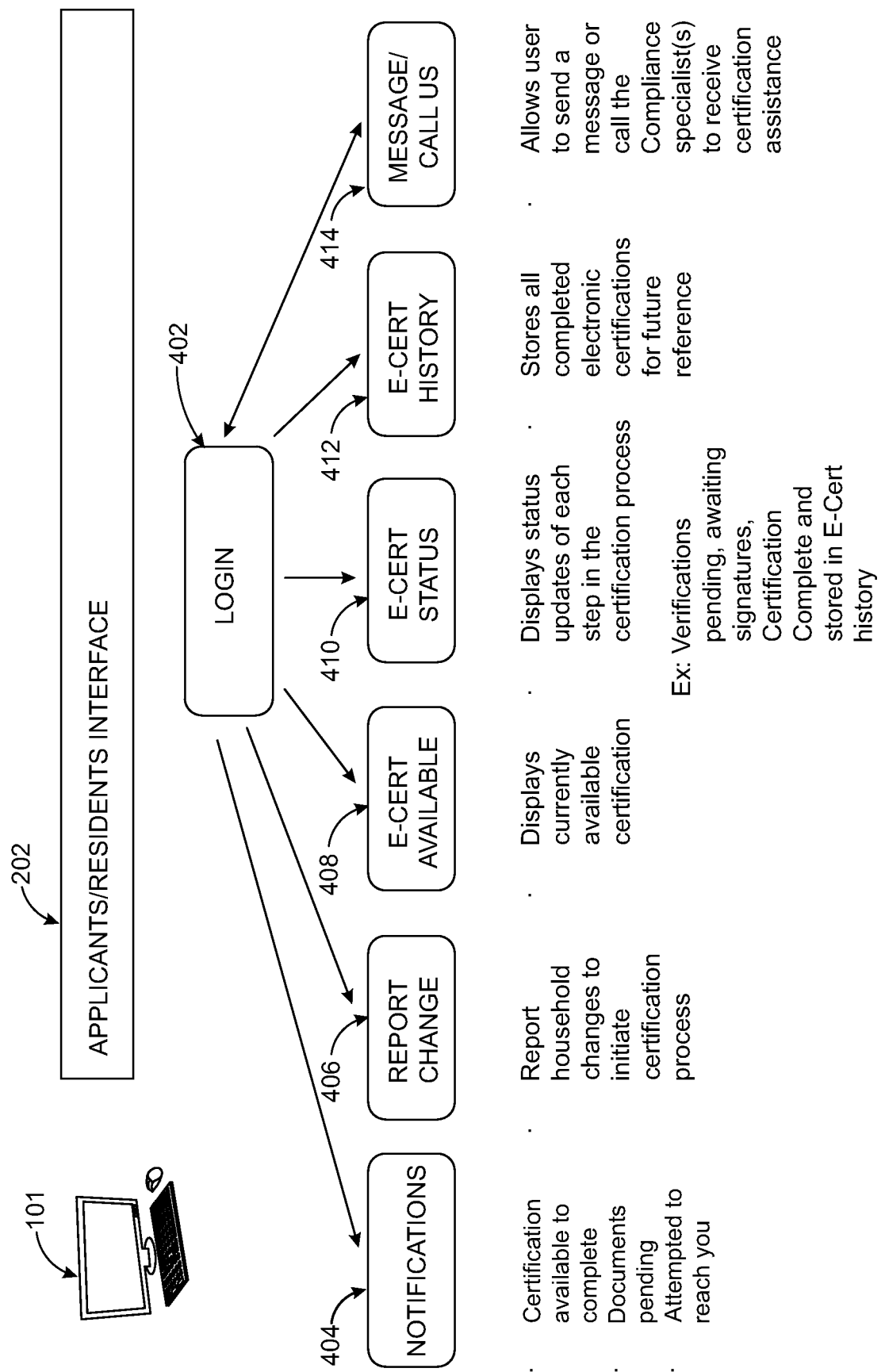
FIG. 4 depicts a pictorial illustration of one or more interfaces of the housing assistance software application available to a resident/applicant.

FIG. 4 provides an example of how resident/application 202 may use one or more interfaces of the affordable housing application 128. As shown in FIG. 4, the resident/application 202 may login 402 to his or her profile or account with the affordable housing application 128. At 404, the affordable housing application 128 may provide relevant notifications to the resident/applicant 202 regarding any information that the resident/application 202 needs to provide and/or of any certifications 208 awaiting completion, including more detailed notifications about the kind of information/documents the resident/application 202 may need to provide. The notifications may also notify the resident/applicant 202 of any pending documents available for review that are saved to the storage associated with affordable housing application 128. Further, the resident/applicant 202 may be notified if any party, such as property management 204, compliance specialist 206, or an administrator 136 tried to reach the resident/applicant 202. At 406, the housing applicant assistance program 128 may prompt the applicant/resident 202 to report any household changes to the initial certification 208 process. At 408, an interface of the affordable housing application 128 may display currently available certifications 208 to the resident/applicant 202. At 410, the affordable housing application 128 may display any status updates for each step of the certification 208 process that applies to the resident/applicant 202. For example, the affordable housing application 128 may provide status updates about any pending verifications or if signatures are being provided or needed, as well as updates if the certification 208 process has been completed and if a completed certification 208 is stored in the "E-Cert History" tab of the affordable housing application 128. At 412, affordable housing application 128 may store all completed electronic certifications 208 for future reference. One of the advantages of affordable housing application 128 is the ability to serve as a central repository and storage for all of the resident/applicant 202's completed questionnaires 222, forms 224, and completed certifications 208.

At 414, the affordable housing application 128 may further allow a resident/applicant 202 to send a message or to call a compliance specialist 206 to receive assistance. Further, in other embodiments, the affordable housing application 128 may allow the resident/applicant 202 to request assistance from an administrator 136 or property manager 204. Advantageously, the resident/applicant 202 may complete any of the steps shown in FIG. 4 remotely and electronically using his or her computing device 101 so as to avoid cumbersome and long trips to an office or other location, which as noted above, is very risky with individuals who are elderly/disabled and with airborne viruses such as COVID-19 being so prevalent.

Figure 5:
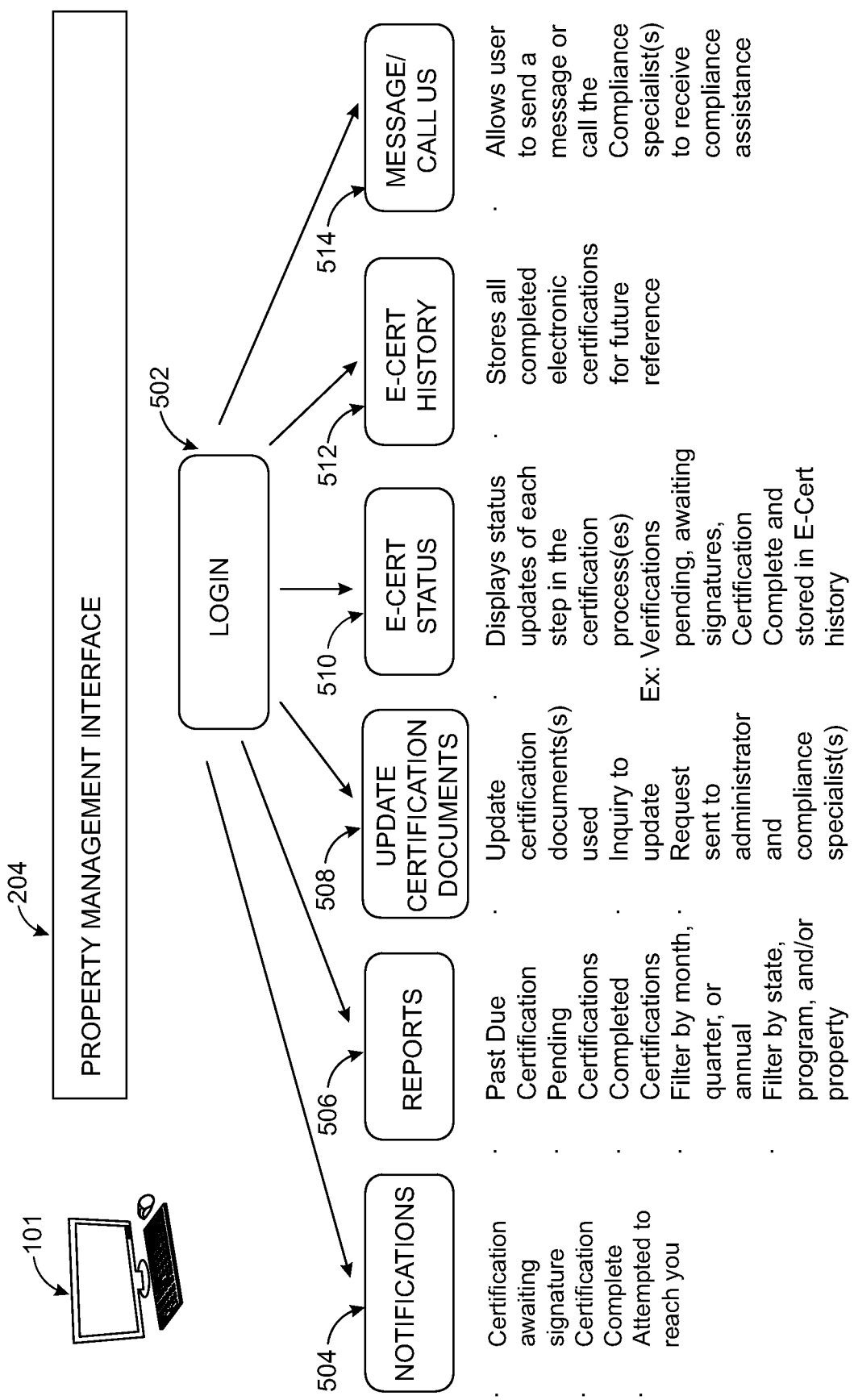
FIG. 5 depicts a pictorial illustration of one or more interfaces of the housing assistance software application available to property management.

FIG. 5 shows a pictorial illustration of functions and features of affordable housing application 128 with a focus on some exemplary interfaces available to property management 204. As shown in FIG. 5, at 502, the property management 502 is able to log into his or her account or profile with affordable housing application 128. At 504, property management 204 may receive one or more notifications for any certification 208 awaiting signature, completed certifications 208, and if anyone attempted to contact any individual associated with property management 204. Further, at 506, the property management 204 may be provided with reports regarding, for example and not limited to, reports about past due certifications 208, pending certifications 208, or completed certifications 208. Further, the property management 204 may be able to filter the reports by month, quarter, or annual time periods and may also further be able to filter the reports by state, program, and/or property.

At 508, the affordable housing application 128 may enable the property management 204 to update certification 208 documents and to respond to any inquires to update certifications 208. Further, the property management 204 may be able to send requests to administrator 136 for assistance or other services and/or to the compliance specialist 206. At 510, the affordable housing application 128 is configured to display status updates for each step in the certification 208 process. This may include any pending verifications or if signatures are needed as well as information about completed certifications 208 that may be stored in the designated storage location in affordable housing application 128. At 512, affordable housing application 128 may have a designated tab or selection interface for the property management 204 to access all completed electronic certifications 208 for future reference. Advantageously, the ability to access all completed certifications 208 electronically may provide peace of mind and reassurance for the property management 204 that all information about a resident/application 204 for the certification 208 process is easily located using affordable housing application 128.

At 514, the property management 204 is enabled to contact an administrator 136, compliance specialist 206, or other party.

Figure 6:
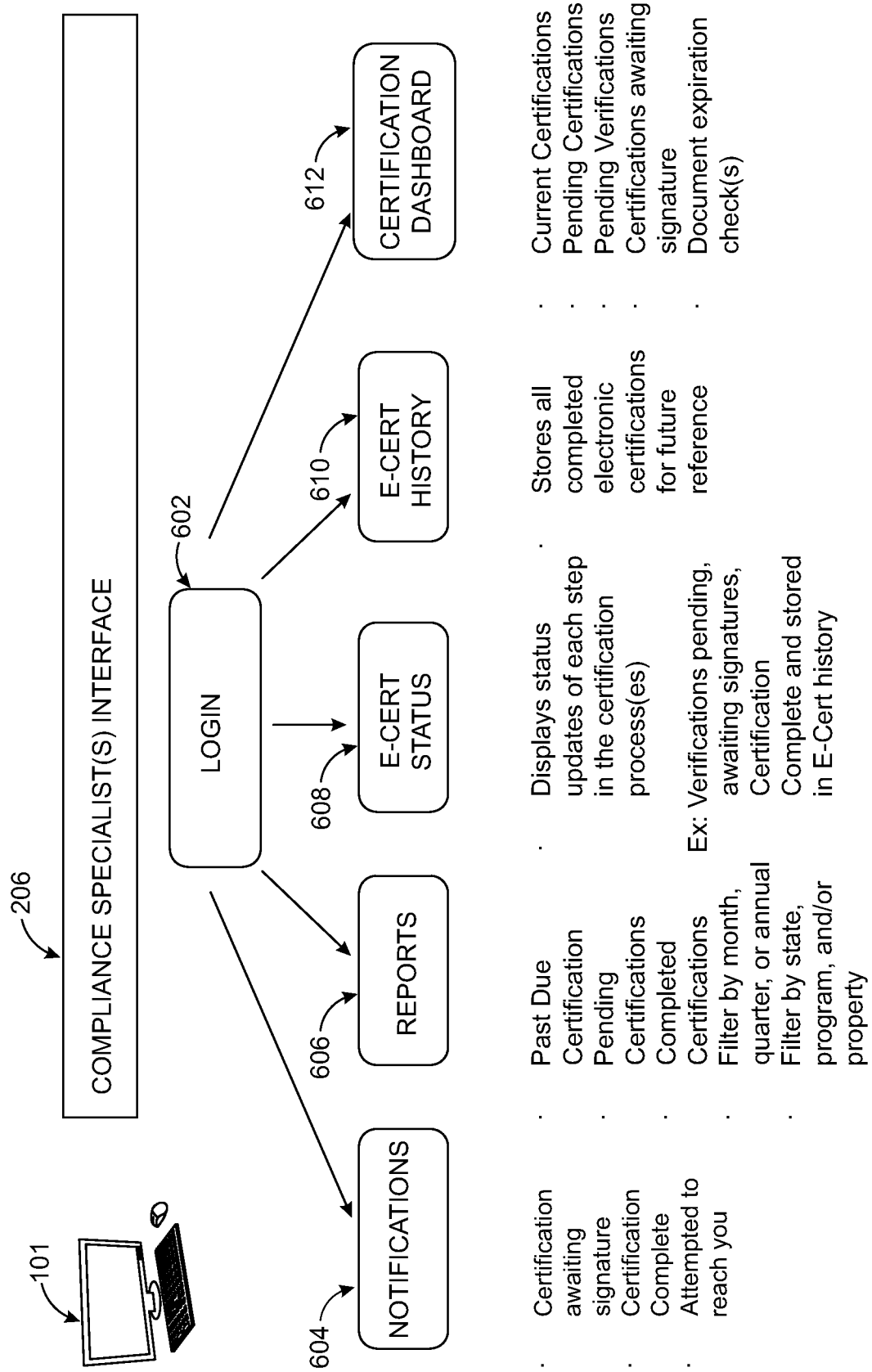
FIG. 6 depicts a pictorial illustration of one or more interfaces of the housing assistance software application available to a compliance specialist.

FIG. 6 provides a similar process flow and illustration regarding the functions and features of affordable housing application 128 provided to the compliance specialist 206 in one or more non-limiting embodiments. At 602, the compliance specialist 206 may log into their profile or account. At 604, the compliance specialist 206 may be notified of any certifications 208 awaiting signatures, completed certifications 208, and any attempts to contact the compliance specialist 206. At 606, affordable housing application 128 may provide one or more interfaces for reports available to the compliance specialist 206, including reports regarding certifications 208 in any stage of the certification process, including past due certifications, pending certifications, and completed certifications. Further, the compliance specialist 206 may be enabled to filter the certifications 208 by month, quarter, or annually as well as by type of affordable housing program 214, property, and/or state. At 608, the affordable housing application 128 may display any status updates and at 610, the affordable housing application 128 may provide access to any historical completed electronic certifications 208 for future reference. Further at 612, the affordable housing application 128 may provide a certification dashboard interface that provides access to information about current and pending certifications 208, pending verifications, certifications 208 awaiting signatures, and any document expiration checks. Accordingly, affordable housing application 128 may serve as a central program that houses all necessary certifications 208 and also reminds the compliance specialist 206 of anything still needed, such as signatures, verifications, and documents.

Figure 7:
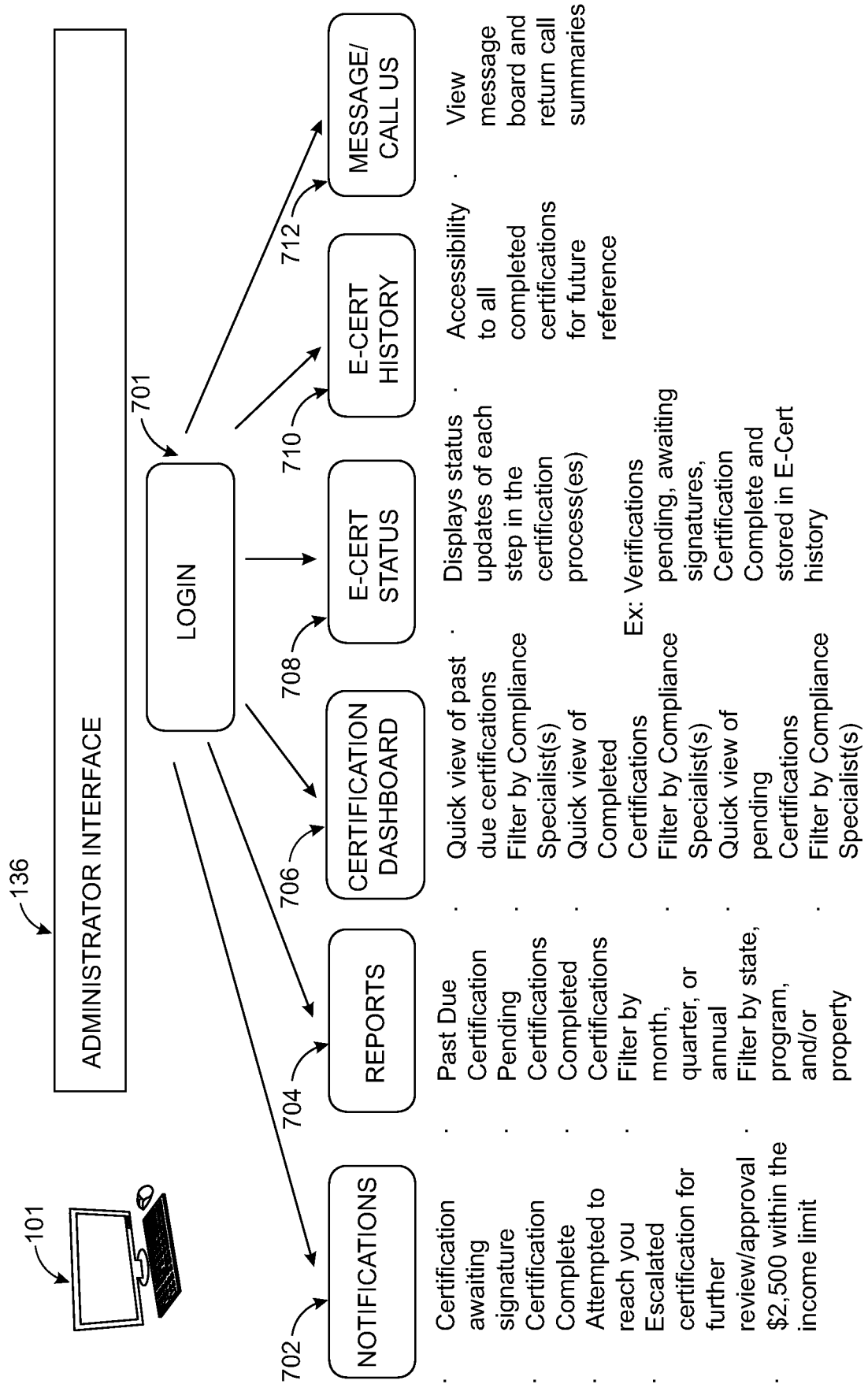
FIG. 7 depicts a pictorial illustration of one or more interfaces of the housing assistance software application available to an administrator.

FIG. 7 shows a pictorial illustration of possible functions and features associated with an administrator 136 of affordable housing application 128. At 701, the administrator 136 may log into his or her profile or account with affordable housing application 128. At 702, the administrator 136 may receive notifications regarding various aspects of affordable housing application 128 requiring administrator's 136 attention, including if there are any certifications 208 awaiting signatures or completed certifications 208. Further, the notifications may relate to any escalated certifications for further review/approval by the administrator 136. At 704, the administrator 136 may be able to view reports that may be filtered on multiple levels (similar to compliance specialist 206) of past due and pending certifications 208 as well as for completed certifications 208. At 706, the certification dashboard interface may enable the administrator 136 a quick view of past due certifications 208, which in a non-limiting embodiment, may be filtered by compliance specialist 206. Any of the view of pending and completed certifications 208 may also be filtered by compliance specialist 206. At 708, the affordable housing application 128 is configured to display status updates of each step in the certification process. At 710, affordable housing application 128 may make all certifications 208, including completed certifications 208, accessible for future reference. Further, at 712, the administrator 136 is enabled to view any message boards and return call summaries.

In addition to the above, affordable housing application 128 may send out notices for reminders of pending deadlines and past due dates to any party utilizing the affordable housing application 128, including the resident/applicant 202, property management 204, compliance specialist 206, and administrators 136.

Affordable housing application 128 is configured to be a one-stop location for all of the needs of resident/applicant 202, property management 204, compliance specialist 206, and any other party (e.g., government representative associated with an affordable/low-income housing program 214). FIG. 8 provides an example of a current checklist 802 used by compliance specialists 206 to keep track of all of the necessary documents, questionnaires 222, and forms 224 needed to comply with current guidelines for the HUD program 216, LIHTC program 218, and blended program 220. As shown in FIG. 8, there are numerous documents and items required for all three programs and to compile these documents for multiple residents/applicants 202 and property management 204 may be very time consuming and difficult. Accordingly, it is readily apparent that the affordable housing application 128 offers multiple advantages and benefits over existing methods of completing certifications 208.

Figure 11:
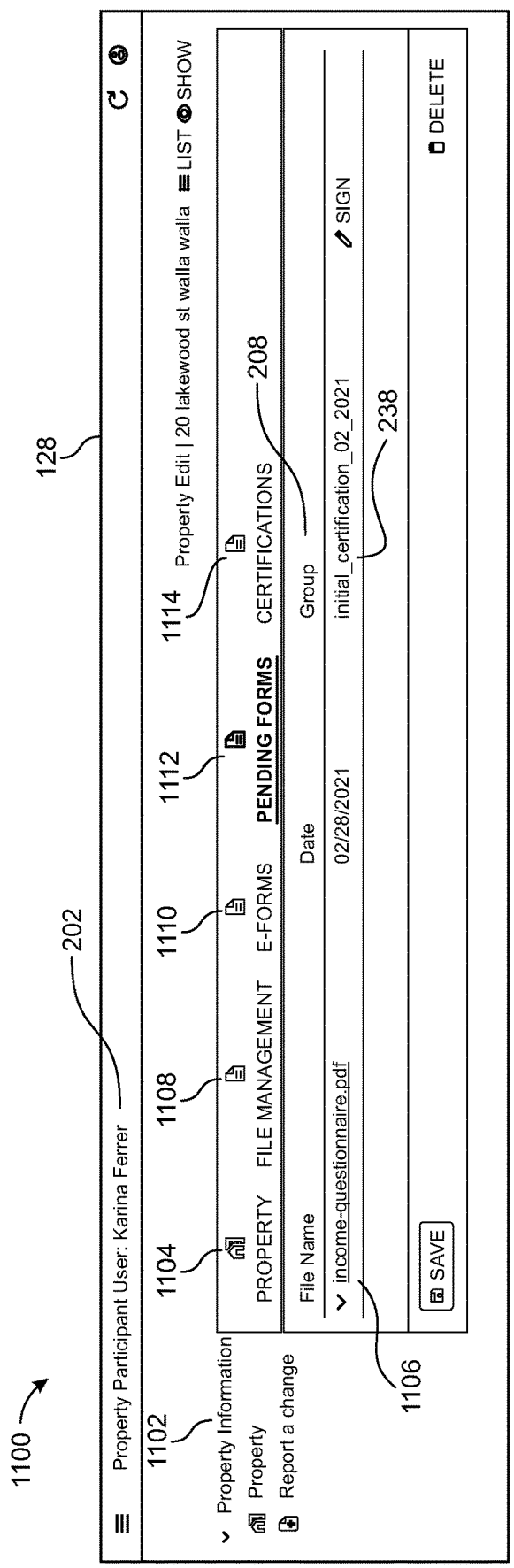
FIG. 11 is a pictorial illustration of an interface displaying a relevant questionnaire for a particular certification type.

Turning to FIG. 11, FIG. 11 shows an exemplary interface 1100 that may be included in the affordable housing program 128. In this exemplary interface 1100, the resident/tenant 202 participant name is included (shown in an example as "Karina Ferrer"). The affordable housing application 128 is configured to provide the tenant 202 with remote access over a network (e.g., network 142) and using one or more computing devices (e.g., user computing device 101) to one or more questionnaires 222, forms 224, and other documents that the tenant 202 needs to view and to provide answers for in order to complete a certification 208 (any type of certification) in order to be or remain eligible to participate in an affordable/low-income housing program 214. The exemplary interface 1100 shown in FIG. 11 includes relevant information about the tenant 202, such as, but not limited to the tenant 202's address and property location. Further, there are various icons/selectors such as the property icon 1104, file management icon 1108, e-forms (electronic forms) icon 1110, pending forms icon 1112, and certifications icon 1114. The tenant 202 or any other party, including a property management 204 representative, compliance specialist 206, and an administrator 136 of the affordable housing application 128 may be able to also access this interface 1100 remotely using their own computing devices to view what the tenant 202 is able to access via the affordable housing program 128 and assist in the completion of any questionnaires 222 or forms 224. Each icon 1104-1114 may be selected to view a variety of relevant information and documents associated with any type of certification 208 for the particular tenant 202.

Income-questionnaire 1106 shown in FIG. 11 shows an exemplary questionnaire 222 that is in this case related to income and includes questions for the tenant 202 about his or her income. An example of such questionnaire 1106 is shown in FIG. 10, which is an actual required questionnaire by government funded affordable/low-income housing programs 214. The questionnaire 222 shown in FIG. 10 and exemplarily represented as the income-questionnaire 1106 file shown in FIG. 11 may include many pages of complex questions related to one's income, household, assets, and other relevant factors that are used to determine whether the tenant 202 is eligible to begin or continue participation of the lower cost benefits offered as part of an affordable/low-income housing program 214.

The income-questionnaire 1106 is available for the tenant 202 (e.g., Karina Ferrer) on the affordable housing application 128 to view and/or fill out and/or sign as needed. The interface 1100 shows that the type of certification 208 is an initial certification 238, meaning that this is the initial certification 238 that must be completed because tenant 202 is moving into a property participating in an affordable/low-income housing program 214 that requires an initial certification 238 to be completed and stored for any future auditing by a program representative/agent 236 of the affordable/low-income housing program 214 (e.g., which may be HUD 216, LIHTC 218, or a blended program 220). In a non-limiting embodiment, any party, including but not limited to, the tenant 202, property management staff 204, compliance specialist 206, and/or administrator 136 of affordable housing application 128, with access to this profile as shown in exemplary interface 1100 may view the income-questionnaire 1106 and its status as a pending form to be completed and signed. Further, the income-questionnaire 1106 can be edited and/or altered by these individuals. In a non-limiting embodiment, the tenant 202 is given remote access over the network 142 using his or her computing device 101 to answer any questions, fields, or other entries in the income-questionnaire 1106 directly using the input devices 106 of his or her computing device 101. In another embodiment, the affordable housing application 128 may be configured to pose specific questions organized and prepared in advance (e.g., by administrator 136 or compliance specialist 206 or another party) that track the questions, fields, or other entries needed in the income-questionnaire 1106. Another interface of affordable housing application 128 may post these questions to the tenant 202. Any answers provided by tenant 202 may be extracted and mapped to the specific questionnaires, fields, and/or entries of the income-questionnaire 1106 and the affordable housing application 128 may populate the data needed for the income-questionnaire 1106 in this manner (i.e., via extracting the answers from the tenant 202 and mapping to the income-questionnaire 1106). Further, there may be one or more selectable explanatory boxes or interfaces that the user may select to provide help and guidance in understanding a question, field, or entry for any form 224 or questionnaire 222 (including the questionnaire 222 shown in FIG. 10).

FIGS. 12-19 display various exemplary interfaces 1200-1900 that may be part of affordable housing application 128 that provide various types of relevant information, including questionnaires 222, forms 224, and other documents that are either completed or need to be completed for a pending or completed certification 208. Further, the information presented may be organized and displayed in various ways to best suit the needs of the property management staff or other representative 204 or the compliance specialist 206 or another party. As noted above, each property participating in an affordable/low-income housing program 214 has to be very vigilant about assembling and completing all relevant questionnaires 222, forms 224, and other types of documents (e.g., proof of income, household, student status, etc.) for certifications 208 in order to have the certifications 208 available for auditing by affordable/low-income program representatives 236 who can visit the property at any time to ensure that the property management 204 is verifying that the tenant 202 is eligible to continue or begin participation in an affordable/low-income housing program 214. If the property management 204 is not vigilant in monitoring certifications 208 for each applicable tenant 202, the property may be fined steep fines by the government or non-government agencies enforcing the affordable/low-income housing programs 214.

Accordingly, the affordable housing application 128 includes various interfaces 1200-1900, as shown in FIGS. 12-19, that can facilitate the assembling of certifications 208 with the correct information from tenant 202 and can facilitate even signing of these documents over the network 128 using one or more computing devices 101.

As shown in FIG. 12, in a non-limiting embodiment, there may be a view of an interface 1200 in which there are several useful icons that provide various types of information to the user. These icons may include property icon 1104, file management icon 1108, e-forms icon 1110, pending forms icon 1112, and certifications icon 1114 as described above with respect to FIG. 11. Further, there may be an additional icon displayed as HOH participants 1202 which refers to "Hard of Hearing" housing participants who may have their own regulations and information that may be required at the time of submission of a certification 208.

As shown in FIG. 12, the certifications name 1203 is displayed with various types of assembled and completed certifications that are pending and awaiting acceptance by the program representatives 236 of an affordable/low-income housing program 214, including documents related to initial certification 238, annual certification 240, interim certification 242, transfer certification 244, and move out certification 246. In the interface 1200 shown in FIG. 12, the certifications icon 1114 is selected and various types of certifications 208 are listed under the certification name 1203. Other types of information may be displayed including date 1204 made or accessed, related to which participant 1206, and status updates 1208. The status updates 1208 may indicate whether the certifications 208 for each participant (listed under "pertaining to" icon 1206) have been accepted, denied, or are still pending for approval by the program representatives 236 and/or affordable/low-income housing programs 214. Further, various elements can be edited 1210 and/or deleted 1212 as needed in this interface 1200.

Figure 13:
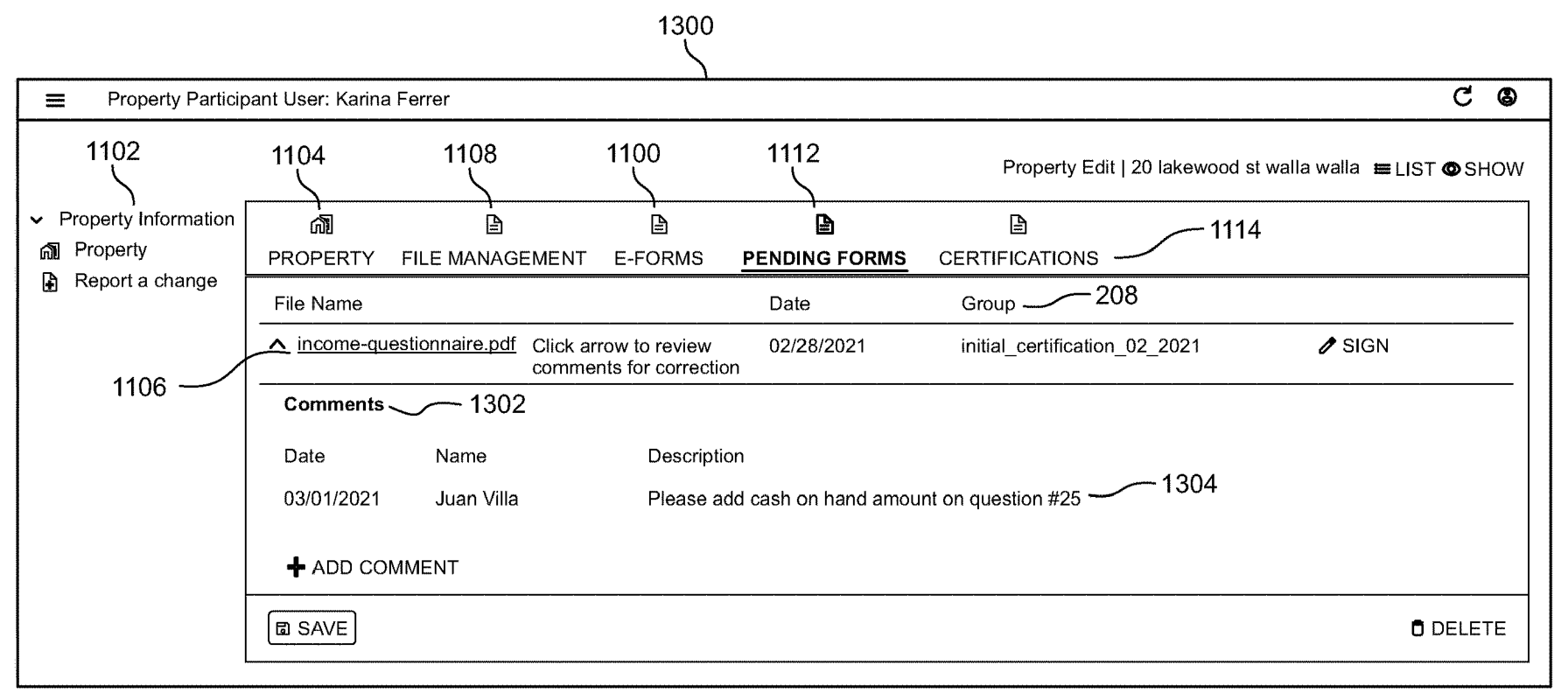

FIG. 13 shows an exemplary interface 1300 in which comments/questions/requests for clarification 1302 may be included within the affordable housing program 128 for posing to the tenant 202 (or another party if needed). The comments/questions/requests 1302, in a non-limiting embodiment, may relate to items that the tenant 202 may need to correct, update, fill out, or provide a response to. For example, as shown in FIG. 13, in the description icon 1304 shown in FIG. 13, the comment requests that the tenant 202 (e.g., Juan Villa) provides a "cash on hand amount answer to question #25" in the income-questionnaire 1106. There may be various ways in which various interfaces of affordable housing application 128 requests information and/or clarification from a tenant 202 or another relevant party within affordable housing application 128. Upon leaving any type of comment, notification, or request for clarification, there may be an alert or notification provide to the tenant 202 or other party via email or phone as well.

Further, a reviewing party, such as the property management staff/representative 204, compliance specialist 206, or administrator 136 reviews the tenant 202's responses to questionnaires 222, forms 224, or other documents for accuracy. In this sense, there may be internal auditing provided by the property management staff/representative 204, compliance specialist 206, or administrator 136 to these pending and/or completed questionnaires 222, forms 224, or other documents. Further, in a non-limiting embodiment, there may be an error checking analyzer built into the affordable housing application 128 that can check for any errors in the completed questionnaires 222, forms 224, or other documents. Accordingly, such interfaces 1300 facilitate the certification 208 process remotely between multiple users and also ensure accuracy and correctness of the supplied information prior to approving the completed certification 208 for review and auditing in the future by the program representative/agent 236 of the affordable/low-income housing program 214.

FIG. 14 shows an exemplary interface 1400 that may be part of affordable housing program 128 in which relevant information about each tenant 202 is organized and displayed in an easy to view manner on affordable housing application 128. For example, as shown in the exemplary interface 1400, the property tenant 202's name, phone, email, relevant apartment or field unit, address and location information for the property, as well as a tenant 202's move-in and expected move out date are displayed. Such interfaces may be of great use and benefit to the property management 204 of a property participating in an affordable/low-income housing program 214 with one or more tenants 202.

Figure 15:
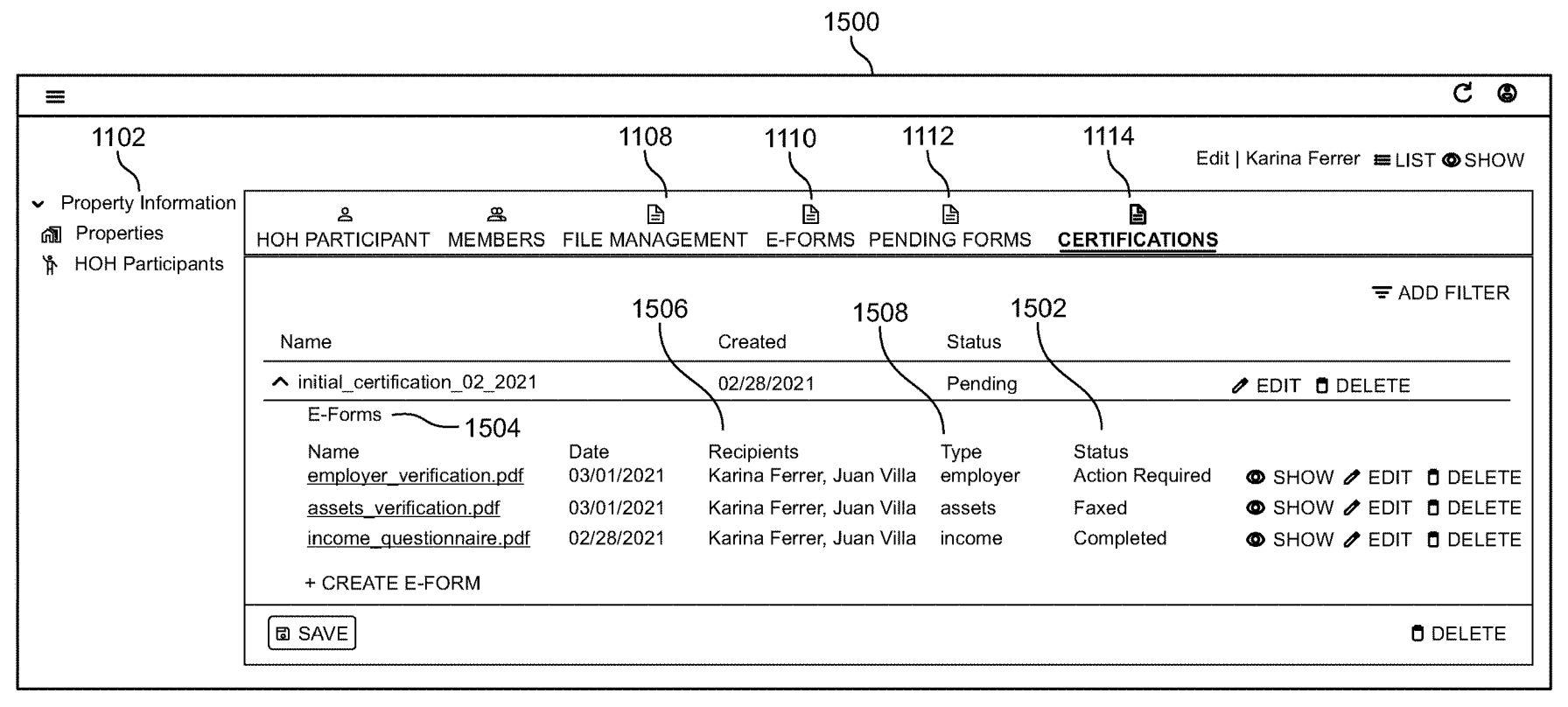

FIGS. 15-16 shows an exemplary interface 1500 displaying status updates 1502 of necessary and required documents for particular certifications 208 for a tenant 202. In an exemplary display, the status updates 1502 may include labels such as "action required," "faxed," and/or "completed" as shown in the exemplary interface 1500 shown in FIG. 15. Many other types of status updates 1502 may be displayed depending on the status. The type and name of the e-forms 1504 are further displayed and may relate, in one or more non-limiting embodiment, to an employer verification document, assets verification document, and/or income questionnaire document, as shown in FIG. 15. FIG. 16 further indicates that the electronic forms (e-forms) 1504 may include documents related to asset records and asset verification. Further, there may be a column or other location of the interface 1500 that includes who the recipients 1506 are of the e-forms 1504 (e.g., forms 224), which may include any party (e.g., tenant 202, property management 204, compliance specialist 206, and/or administrator 136). Further, the interface 1500 may indicate a document type 1508, including but not limited to, whether the document relates to an employer, assets, or income verification. All of these files and their meta data can be displayed, edited, or deleted as needed in the exemplary interface 1500 of the affordable housing program 128.

FIGS. 17-19 display various exemplary interfaces 1700, 1800, and 1900 that include the name and type 1203 of relevant form (including any questionnaires 222, forms 224, or other types of documents, such as, but not limited to, asset, employer, household, and/or student verifications) as well as dates 1204 created and/or accessed. The interfaces 1700-1900 may further categorize and organize these documents as they relate to a tenant 202 or another party and further may categorize each document as being associated with a particular type of certification 208 (e.g., whether the certification 208 is an initial certification 238, annual certification 240, interim certification 242, transfer certification 244, or move out certification 246).

FIGS. 18-19 may display interfaces 1800-1900 displaying relevant information related to the pending and/or completed certifications 208. For example, interface 1900 may show any relevant information about a questionnaire 222, form 224, or other type of document in another table that organizes key features of each file including type 1510 of document, when the information was sent 1904, who created the file 1906, when the document or file was updated 1908, as well as certification group type and/or status as shown in the exemplary interface of FIG. 19.

Figure 20:
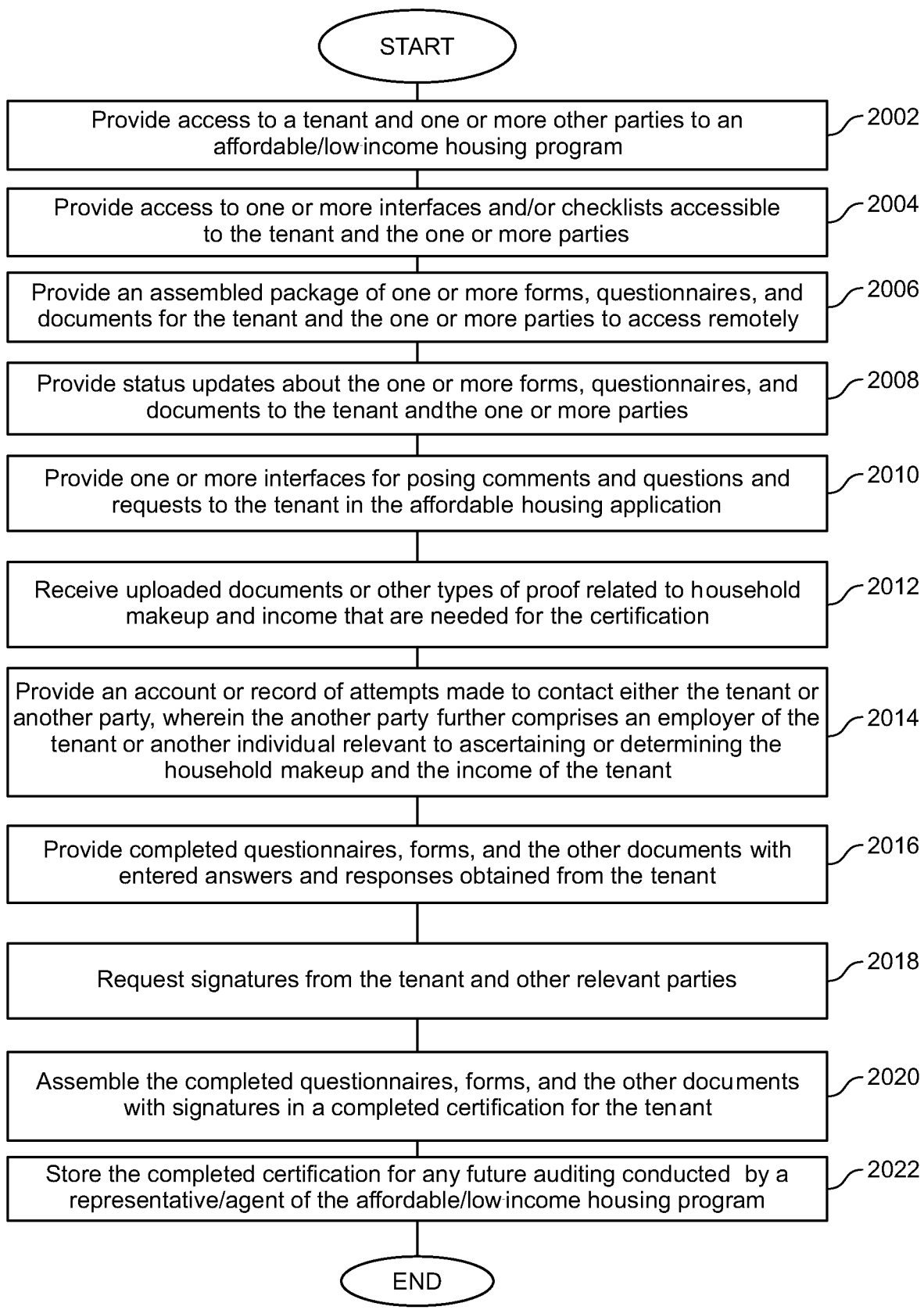
FIG. 20 is a flowchart of an exemplary method of using a computer implemented affordable housing application.
Figure 21:
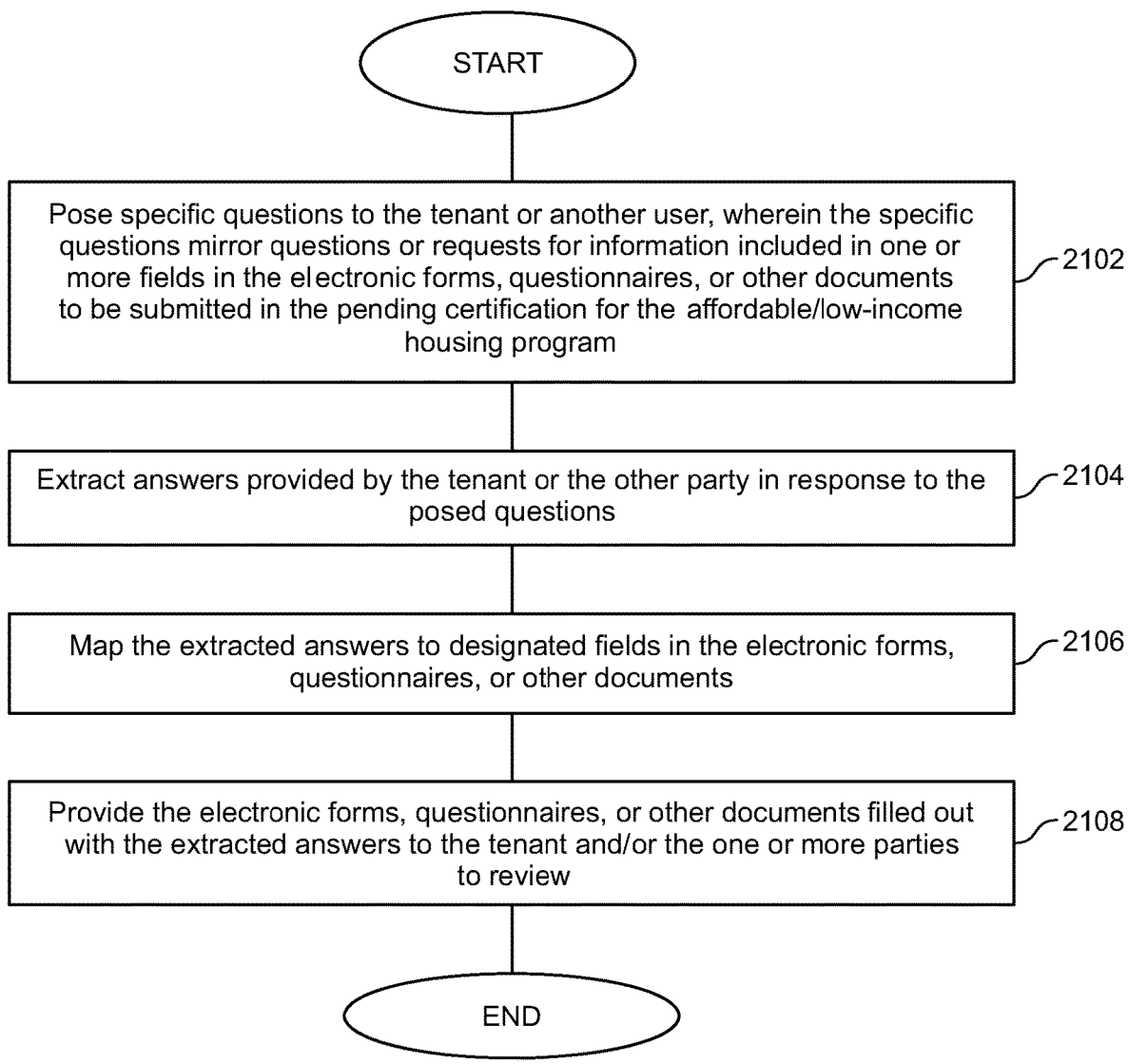
FIG. 21 is a flowchart with additional steps for an exemplary method of using a computer implemented affordable housing application.

FIG. 20 and FIG. 21 are flowcharts illustrating exemplary methods of using the affordable housing application 128 according to one or more non-limiting embodiments. FIG. 20 may begin, in a non-limiting embodiment, with step 2002, in which a tenant 202 and one or more other parties, including, but not limited to tenant 202, property management 204, compliance specialist 208, administrator 136, and/or the program representative/agent 236 are provided access to the affordable housing application 128 in order to complete any type of certification 208 required for an affordable/low-income housing program 214. The affordable housing application 128 provides remote access over a network 142 using one or more computing devices to the tenant 202 and other parties to provide necessary information required to complete the certification 208, whereby the certification 208 affirms the tenant 202 is eligible to be a participant of the affordable/low-income housing program 214.

At step 2004, the method may include providing one or more interfaces and/or checklists (such as checklist 802 shown in FIG. 8) with necessary items for completing the certification 208 depending on the type of affordable/low-income housing program 214 the tenant 202 is a participant of and depending on the type of electronic certification (e.g., 238-246 as shown in FIG. 2) to be completed, further comprising making the one or more interfaces and/or checklists accessible to the property management 204 of a property where the tenant 202 resides so that the property management 204 is informed as to items required as stated in the one or more interfaces and/or checklists. At step 2006, the method may include providing an assembled package of one or more forms, questionnaires, and documents for the tenant 202 and the one or more parties to access remotely, whereby the tenant 202 is required to provide responses and answers and fill out the one or more questionnaires 222, forms 224, and documents as presented and stored in the affordable housing application 128. At step 2008, the method may include providing status updates about the one or more questionnaires 222, forms 224, and documents to the tenant 202 and the one or more parties, whereby the status updates indicate whether the one or more questionnaires 222, forms 224, or other documents are pending or completed or further action is required. At step 2010, the method may further include providing one or more interfaces for posing comments and questions and requests for clarification (e.g., as shown in FIG. 13) to the tenant in the affordable housing application 128, whereby the one or more other parties are able to make requests and respond to questions posed by the tenant 202 in the one or more interfaces. At step 2012, the method may further include receiving uploaded documents or other types of proof related to household makeup and income that are needed for any type of certification 208. At step 2014, the method may further include providing an account or record of attempts made to contact either the tenant 202 or another party, whereby the other party may further comprise an employer of the tenant or another individual relevant to ascertaining or determining the household makeup or the income of the tenant 202. At step 2016, the method may further include providing completed questionnaires 222, forms 224, and the other documents with entered answers and responses obtained from the tenant 202. At step 2018, the method may further include requesting signatures from the tenant 202 and other relevant parties. A step 2020, the method may further include assembling the completed questionnaires 222, forms 224, and the other documents with signatures in a completed certification for the tenant 202. At step 2022, the method may further include storing the completed certification for any future auditing conducted by a representative/agent 236 of the affordable/low-income housing program 214.

FIG. 21 is an additional exemplary method for another manner in which affordable housing application 128 may provide the required data or information in the questionnaires 222, forms 224, and other documents. At step 2102, the method may begin with posing specific questions to the tenant or another user, whereby the specific questions mirror questions or requests for information included in one or more fields in the electronic forms 224, questionnaires 222, or other documents to be submitted in the pending certification 208 for the affordable/low-income housing program 214. At step 2104, the method may include extracting answers provided by the tenant or the other party in response to the posed question. At step 2106, the method may include mapping the extracted answers to designated fields in the electronic forms 224, questionnaires 222, or other documents. At step 2108, the method may include providing the electronic forms 224, questionnaires 222, or other documents filled out with the extracted answers to the tenant or the other party to review for accuracy and correctness. The steps 2102-2108 may be performed in combination with other method steps shown, for example, in FIG. 20 and as listed in the claims below. The steps 2102-2108 as shown in FIG. 21 may be accomplished using created questions that mirror the questions listed in required forms 224 and questionnaires 222 that must be submitted as part of any particular pending certification 208, as shown in FIG. 2. FIG. 9 includes an exemplary questionnaire 222 that has questions 902 that must be answered as part of a certification 208. The affordable housing application 128 may create the posed questions, as described in step 2102 of FIG. 21, and any answer supplied by the tenant 202 or another party (e.g., parties 204, 206, and 136) may be extracted and mapped to the designated spots or spaces or fields 904 as shown in FIG. 9 in the form 224 or questionnaire 222. The tenant 202 and other parties 204,206, and/or 136 may then be enabled to view the completed form 224 or questionnaire 222 to review. If any edits to the extracted/mapped answers are needed, the tenant 202 or other parties 204,206, and/or 136 may make such edits and then sign the completed form 224 or questionnaire 222 using one or more interfaces in affordable housing application 128. Alternatively, if no edits are required, the tenant 202 or other appropriate party may sign the completed form 204 or questionnaire 222 using one or more interfaces in affordable housing application 128.

Figure 22:
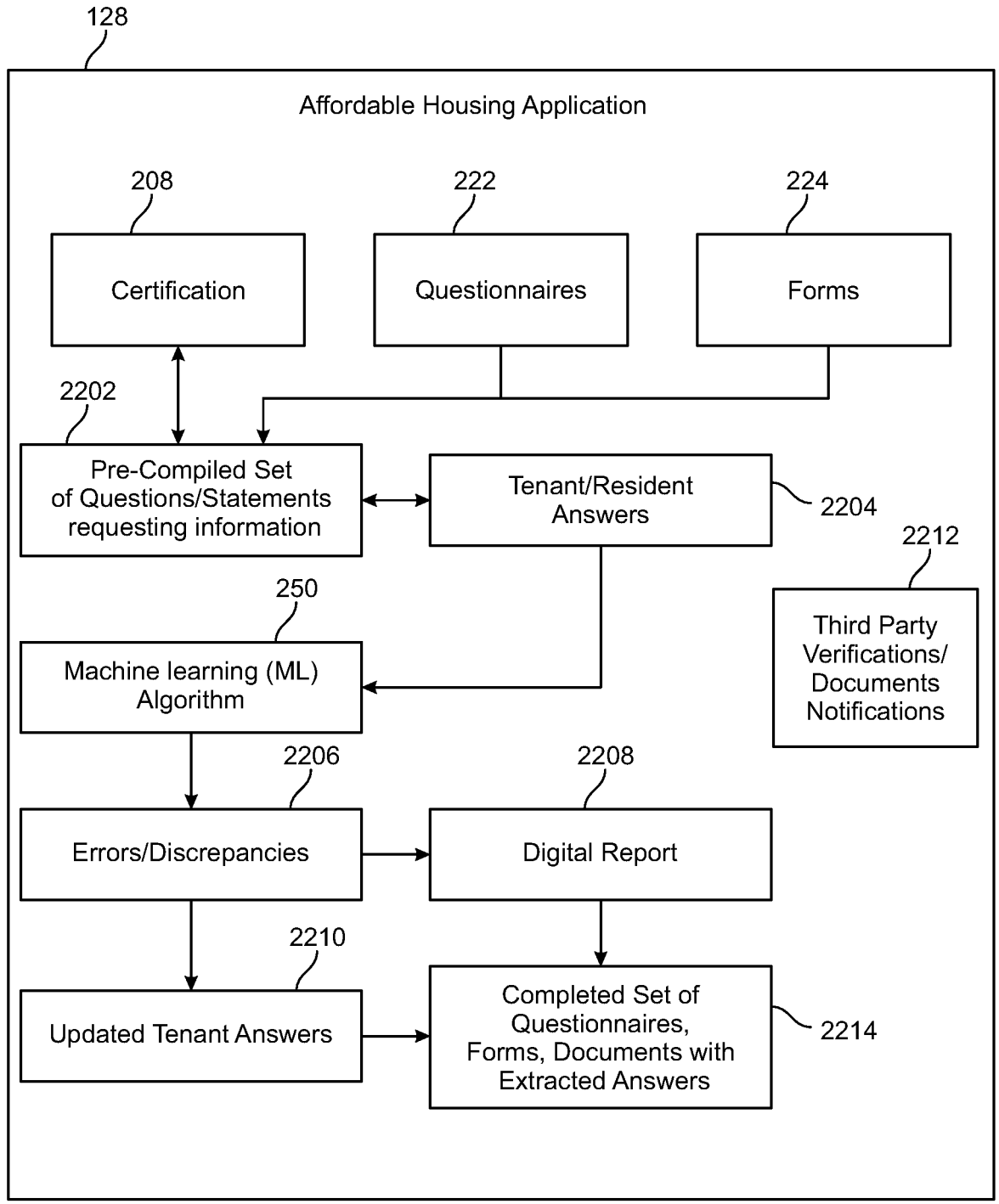
FIG. 22 is an example block diagram of additional components of the affordable/low-income housing application.
Figure 23:
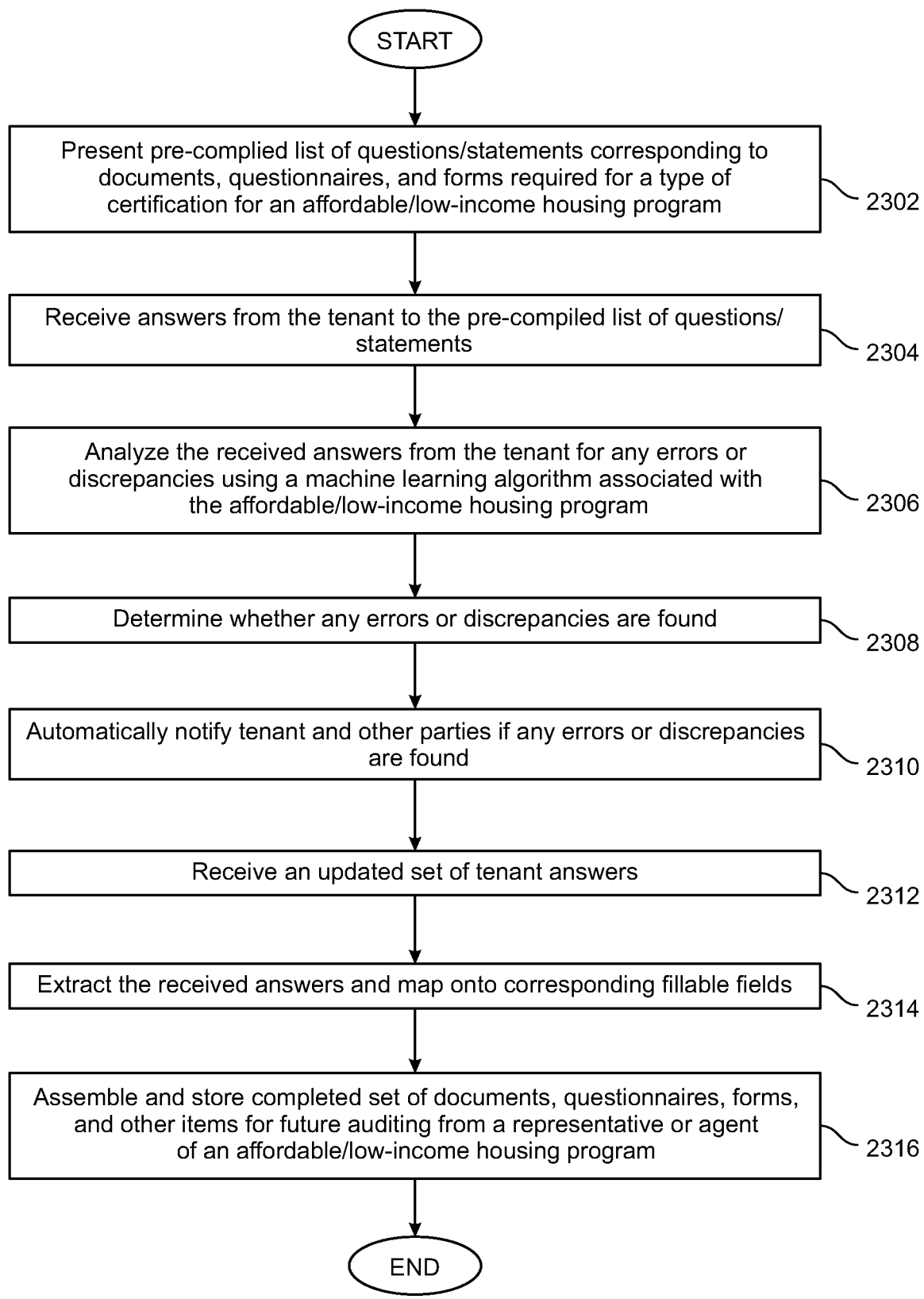
FIG. 23 is an example flowchart for additional steps for using the affordable/low-income housing application.

Turning to FIG. 22 and FIG. 23, FIG. 22 and FIG. 23 provide a block diagram and a flowchart respectively of an exemplary process provided by the affordable housing application 128 according to one or more non-limiting embodiments. In a non-limiting embodiment, the affordable housing application 128 includes a machine learning algorithm 250 capable of being trained to detect errors or discrepancies 2206 in the set of answers 2204 provided by a tenant and/or resident 202. In a non-limiting embodiment, as shown in FIG. 22, once it has been determined which type of certification 208 a particular tenant 202 requires, the tenant 202 may be provided with a pre-compiled set of questions 2202 via one or more interfaces of the affordable housing application 128. The pre-compiled set of questions 2202 may present in a summarized, clear, and straightforward manner a set of questions that relate and correspond to actual questions or requests for information or instructions included in specific questionnaires 222, forms 224, or other documents associated with each type of certification 208. Such questionnaires 222, forms 224, or other documents may be related to an initial or move-in certification 238, an annual certification 240, an interim certification 242, a transfer certification 244, and/or a move out certification 246 as shown in FIG. 2 and described above.

The pre-compiled set of questions 2202 may be prepared by one or more parties with knowledge about the required documents and items required for a certification 208, including, but not limited to, an administrative entity representative 136, a compliance specialist 206, or another party. The pre-complied set of questions/statements requesting information 2202 may be a set of digital questions and/or statements requesting information that relate to specific questions or statements included in a questionnaire 222 or form 224 or other necessary document that is associated with a government or private affordable/ow-income housing program 214.

For example, as shown in the questionnaire 222 shown in FIG. 9, there are a series of questions and/or statements requesting information 902 included on the affordable housing program 214 questionnaires 222 and forms 224 that the tenant 202 has to fill out accurately and correctly, and that frequently lead to a requirement to provide further information (e.g., a list of bank accounts at banks that a bank representative must verify). The pre-compiled set of questions/statements 2202 may be based on a review of such questionnaires 222, forms 224, and/or other documents required for a specific type of certification 208, but the pre-compiled set of questions/statements 2202 are not presented necessarily in the same order or manner as shown on the questionnaire 222 and the forms 224. Rather, the administrative entity 136 and/or the compliance specialist 206 may organize the pre-compiled set of questions/statements requesting information and/or verification 2202, as shown in FIG. 22, in a different order and may pose the questions/statements 2202 in a different manner in an effort to clearly obtain consistent answers from the tenant 202.

The pre-compiled set of questions/statements 2202 may be organized and assembled as a set of questions/statements in a single or multiple interfaces that can be filled out by the tenant 202 in one or more non-limiting embodiments using the affordable housing application 128. The tenant 202 may be able to start, stop, and pause the process when filling out and providing the tenant's answers 2204 responding to the pre-compiled set of questions/statements requesting information 2202 thus giving the tenant 202 time and ability to collect information and respond to the pre-compiled set of questions/statements 2202 as needed. Accordingly, the affordable housing application 128 may dedicate a particular process in its memory and processing to save automatically a partially completed pre-compiled set of questions/statements requesting information 2202 as the tenant/resident/application 202 undergoes completing the pre-compiled set of questions/statements requesting information 2202. It is noted that the questionnaires 222 and forms 224 required by each type of certification 208 usually involve numerous and lengthy questions/statements for verification that take a great deal of time and attention from the tenant/resident 202. The pre-compiled set of questions/statements 2202 may be a simplified version of the same questions/statements a tenant 202 would be required to answers in the actual questionnaires 222 and forms 224.

Further, in a non-limiting embodiment, the affordable housing application 128 can include a selectable explanation digitally presented for each question/statement from the pre-compiled set of questions/statements requesting information 2202. In a non-limiting embodiment, this may include pop-up windows with digital explanations and examples of answers required from the tenant 202. In a non-limiting embodiment, this may alternatively or additionally include a video tutorial with one or more explanations for what is required for each questions/statement for the pre-compiled set of questions/statements 2202.

Once the user provides the tenant/resident answers 2204 which is submitted to the affordable housing application 128, and may be viewed to the accessible profile or portal associated with each tenant 202, in a non-limiting embodiment, the tenant/resident answers 2204 may be submitted for analysis to the ML algorithm 250, which can be trained to detect and spot errors/discrepancies 2206 in the received set of answers 2204 from the tenant 202. In a non-limiting embodiment, the ML algorithm 250 may be a supervised ML algorithm 250 that relies on labelled input and output training data. Alternatively, the ML algorithm 250 may be an unsupervised ML algorithm 250 that processes unlabeled or raw data. The ML algorithm 250 may include input and training provided by the administrative entity 136 and/or compliance specialist 206 and/or property management 204 in one or more non-limiting embodiments. In a sense, the ML algorithm/module 250 can serve as a quality control module to ensure that the received set of tenant's answers 2204 do not have any glaring errors, discrepancies 2206 and/or inconsistencies. If the ML algorithm is executed against the received set of tenant answers 2204, then in a non-limiting embodiment, the ML algorithm may create a digital report 2208 with the listed errors/discrepancies 2206 or other spotted issues. As used herein, digital report 2208 may refer to a report with a summary of listed errors/discrepancies 2206 and can be viewed/seen/shared via one or more interfaces of the affordable housing application 128. The digital report 2208 may also be sent via email, instant message, text, fax, or another means of communication to one or more parties including the resident 202 and/or compliance specialist 206 and/or property manager 204.

In a non-limiting embodiment, once the tenant's answers 2204 have been analyzed by the machine learning algorithm 250 for errors and other discrepancies, an updated set of tenant answers 2210 may be assembled. The updated set of tenant answers 2210 may be updated with corrected answers by the tenant 202 and/or updated answers as entered by the compliance specialist 206 or property manager 204. In a non-limiting embodiment, the updated set of tenant answers 2210 may be assembled and organized into a completed set of questionnaires, forms, documents 2214 with answers extracted from the updated set of tenant answers 2210, all of which may be implemented using one or more modules of the affordable/low-income housing application 128. The completed set of questionnaires, forms, and documents 2214 including affidavits and third party verifications may be stored by the affordable housing application 128 and made easily accessible to a number of parties via the affordable housing application 128, including the tenant 202, the administrator 136, the property management 204, the compliance specialist 206, and the program agent or representative 236.

In a non-limiting embodiment, it is noted that the affordable/low income housing application 128 is configured to extract specific answers from the updated tenant answers 2210 and map or enter automatically and electronically the extracted answers to specific spaces/fillable fields 904, such as those shown in FIG. 9 and FIG. 10, for any relevant questionnaires 222 or forms 224 for one or more certifications 208.

In a non-limiting embodiment, the affordable housing application 128 may be programmed to scan and review the tenant/resident answers 2204 to determine whether any of the answers 2204 and/or 2210 provided by the tenant 202 require third party verifications and/or documentation. Such third party verifications and/or third party documentation may include verifications and/or documents provided by third parties including employers, financial institutions, legal agents or representatives, or any other party that can provide required corroborating information or documentation regarding assets, employers, a household, and/or student verifications for a tenant 202. In a non-limiting embodiment, the affordable housing application 128 may utilize a machine learning algorithm 250 or another module to determine that one or more contacts associated with a third party should be automatically notified (e.g., via notifications 2212) to provide the necessary third party verifications and third party documentation required to complete the remote certification 208. In a non-limiting embodiment, there may be a database accessible by the affordable housing application 128 that includes emails and/or digital fax numbers for responsible contacts associated with either an employer, financial institution, or another entity required for a third party verification and/or third party documentation. Responsive to verifying a tenant's answer that a third party verification and/or documentation is required, the affordable housing application 128 may send notifications 2212 as shown in FIG. 22 to these third parties to provide the verifications and documentation. In a preferred, non-limiting embodiment, the affordable housing application 128 may be configured to send such notifications via email, text, or instant message to one or more third parties to provide the necessary verifications and documentation from a third party. It is advantageous that the affordable housing application 128 includes such a function as it is often a time-consuming and difficult process to obtain third party verifications and third party documentation.

Similarly, the affordable housing application 128 may be programmed to automatically initiate a certification process to verify eligibility of the tenant to remain in the type of certification upon receiving any notification of household changes from the tenant through the affordable/low-income housing application after the tenant has been certified at least once. In a non-limiting embodiment, the household changes may relate to any updated information entered into one or more interfaces of the affordable housing application 128 regarding an increase or decrease in a number of people in the tenant's 202 household, a change in income or financial status for the tenant 202, a change in marital status for the tenant 202, and/or a change in employment for the tenant 202.

Further, the affordable housing application 128 may be programmed to automatically and electronically notify a tenant 202 or another party to submit any affidavits that need to be completed for the type of certification 208. The affidavits may relate to affidavits affirming the income, assets, student status or information, credit, race, ethnicity, or household makeup of the tenant 202.

FIG. 23 provides an exemplary flowchart related to one or more functions of the affordable housing application 128. As shown in FIG. 23, the method may include at step 2302, presenting pre-complied list of questions/statements 2202, as shown in FIG. 22 and described above, corresponding to documents, questionnaires 222, and forms 224 (e.g., as shown in FIG. 2 and in FIG. 9 and in FIG. 10 and explained further above) required for a type of certification for an affordable/low-income housing program. At step 2304, the method may include receiving the tenant answers 2204 to the pre-compiled list of questions/statements 2202. At step 2306, the method may further include analyzing the initial set of received answers from the tenant 2204 for any errors or discrepancies 2206 using a machine learning algorithm 250 associated with the affordable/low-income housing program 128. At step 2308, the method may further include determining whether any errors or discrepancies 2206 are found or detected by the machine learning algorithm 250. In a non-limiting embodiment, a digital report 2208 may be produced listing any errors, discrepancies 2206 or other issues (e.g., needed notifications 2212 to third parties for third party verifications and/or documentation).

At step 2310, the method may further include automatically notifying a tenant 202 and other parties if any errors or discrepancies 2206 are found. At step 2312, the method may further include receiving an updated set of tenant answers 2210 with corrected answers as supplied by either the tenant 202, a property manager 204, and/or compliance specialist 206, or another party or by edits provided from machine learning algorithm 250 to the tenant answers. At step 2314, the method may include extracting the received updated answers 2210 and mapping onto corresponding fillable fields 904 in one or more fillable questionnaires 222 and/or forms 224 or other documents associated with a certification 208 for an affordable/low-income housing program 214. It is noted that such questionnaires 222 and forms 224 are usually very lengthy and are typically filled out by hand by the tenant 202 or by a compliance specialist 206. Advantageously, in a non-limiting embodiment, the affordable housing application 128 is configured and trained to interpret answers provided by the tenant (e.g., 2204 and 2210) in order to map the correct extract answers to fillable spaces 904 in the questionnaires 222 or forms 224 associated with the certification 208, which makes the process smoother, easier, and more accurate for the tenant 202, property manager 204, and/or the compliance specialist 206. At step 2316, the method may include assembling and storing a completed set 2214 of documents, questionnaires 222, forms 224, and other items for future auditing from a representative or agent 236 of an affordable/low-income housing program 214, including government agents.

In a non-limiting embodiment, the affordable housing application 128 may include additional functions and features, such as, but not limited to, one or more automated, pre-set calls, emails, instant messages, texts, or another type of communication pertaining to the process status, income, assets, or other issues associated with the tenant's 202 certification 208. Further, the affordable housing application 128 may include the ability to communicate when any errors are detected (e.g., at step 2306 and step 2308 in FIG. 23) to the tenant 202 and/or another party via automated pre-set calls, emails, instant messages, texts, or any other type of communication. Further, in a non-limiting embodiment, the affordable housing application 128 may automate the certification process annually and 120 days prior to the certification 208 due date. Further, the affordable housing application 128 may send automatic document update requests to property management 204 responsive to changes and updates provided by the tenant 202 regarding the tenant's 202 household, assets, income, or other relevant factor.

Accordingly, affordable housing application 128 offers a multi-functional, complete system to assist in the assembling and organization of all required documents for any type of certification 208 for a tenant 202 of an affordable/low-income housing application 128. The affordable housing application 128 benefits multiple individuals including companies that assist with affordable housing compliance as a whole. The affordable housing application 128 acts to save time, money, and resources. Further, the affordable housing application 128 allows the tenant 202 and other parties to communicate and coordinate any necessary documents and information needed to complete a certification 208 correctly using one or more computing devices 101 over a network 142 without requiring the tenant 202 and other parties to meet in person on every occasion whether a signature is required or documents need to be shared or another piece of information supplied. There are many other advantages and benefits offered by the one or more non-limiting embodiments of the affordable housing application 128 as described above.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, and steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)— (a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may refer to a direct or indirect connection. The term "set" as used herein may refer to one or more items.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for digitally validating remote certification for an affordable/law-income housing program, the system comprising:
    one or more processors; and
    system memory coupled to the one or more processors and storing instructions configured to cause the one or more processors to implement all or part of an affordable/low-income housing application in the system memory, including:
        present, via the one or more processors, one or more interfaces of the affordable/low-income housing application to a tenant and one or more other parties to electronically and remotely complete any type of certification in order to provide remote access over a network using one or more computing devices to the tenant to provide, necessary information required to complete the any type of certification, wherein the one or more other parties further comprise property management and/or staff, compliance specialists, and/or administrators of the affordable/low-income housing application;
        training a machine learning algorithm using labelled input training data and labelled output training data to detect specific types of errors or discrepancies in answers provided by a tenant;
        determine what type of certification the tenant is eligible to participate in using user feedback and determining if the tenant has any prior certifications or if the tenant is participating in a move-in initial certification;
        responsive to determining what type of certification the tenant is eligible to participate in based on the initial set of questions, present, via the one or more processors, a pre-compiled list of questions/statements requesting information in an interface to the tenant, wherein the pre-compiled list of questions/statements requesting information corresponds to a set of fillable fields for one or more questions and/or requirements for a set of documents, questionnaires, forms, or other items to be submitted for a type of certification, wherein the type of certification comprises any one of an initial or move-in certification, an interim certification, a transfer certification, an annual certification, or a move-out certification;

receive, via the one or more processors, answers from the tenant to the pre-compiled list of questions/statements requesting information;

upon receiving, via the one or more processors answers from the tenant to the pre-compiled list of questions/statements requesting information, analyze, via the one or more processors, the received answers from the tenant for errors or discrepancies using the machine learning algorithm associated with the affordable/low-income housing application that is trained to detect the errors or discrepancies in the received answers;

determine, via the one or more processors, whether the machine learning algorithm found or flagged the errors or discrepancies in the received answers from the tenant;

if one or more of the errors or discrepancies are found or flagged, automatically notify the tenant through an interface of the affordable/low-housing application of the errors or discrepancies in order to correct the received answers and execute and provide access via the affordable/low-income housing application to a digital report that compiles and lists the errors or discrepancies;

responsive to notifying the tenant through the interface of the affordable/low-housing application of the errors or discrepancies, present one or more second questions and/or statements corresponding to the pre-compiled list of questions and/or statements but in a different order and manner through the interface for the user to enter an updated set of tenant answers in response to the second questions and/or statements;

receive, via the one or more processors, the updated set of tenant answers;

extract, via the one or more processors, correct answers obtained from the updated set of tenant answers;

responsive to extracting the correct answers from the updated set of tenant answers, automatically, via the one or more processors, map and enter the correct answers to corresponding fillable fields from the set of fillable fields for the one or more questions and/or requirements for the set of documents, questionnaires, forms, or other items;

automatically initiate a certification process to verify eligibility of the tenant to remain in the type of certification upon receiving any notification of household changes from the tenant through the affordable/low-income housing application after the tenant has been certified at least once, further comprising, reviewing changes made to a household of the tenant and notifying a client if eligible to remain in the type of certification;

using the machine learning algorithm, review the updated set of tenant answers to determine whether third party verifications and third party documentation relating to the tenant's employment, financial status, student status, or other matters are required for the type of certification;

verify whether all the third party verifications and the third party documentation have been provided;

if the third party verifications and the third party documentation have not been provided, retrieve from a database valid third party contacts to request the third party verifications and third party documentation relating to the tenant's employment, financial status, or other matters;

send notifications through the affordable/low-housing application to the third party contacts to provide third party verifications and third party documentation;

store any received third party verifications and third party documentation directly in the affordable/low-income housing application and indicate a status of level of completion for the third party verifications and third party including indicating whether the third party documentation relate to income verification or asset verification or employment verification and labeling each document visually according to a determination related to whether the third party documentation qualifies as the income verification, the asset verification, or the employment verification;

display in a graphical user interface relevant data for documents that relate to required asset verification, income verification, and employment verification, further comprising, displaying in the graphical user interface a name of each document, a type of certification and whether the document relates to an initial certification, an annual certification, an interim certification, a transfer certification, or a move out certification, listed recipients who can access the document, a status associated with approval and/or completion or action still required for the document, and an ability to edit a document using the graphical user interface;

assemble, via the one or more processors, a completed set of documents, questionnaires, forms, or other items to be submitted for the type of certification; and store, via the one or more processors, the completed set of documents, questionnaires, forms, or other items to be submitted for the type of certification for future auditing conducted by a representative/agent of the affordable/low-income housing program.

2. The system of claim 1, wherein the machine learning algorithm associated with the affordable/low-income housing application is trained to detect the specific types of errors or discrepancies in the received answers based in part on input and training data from an administrative entity.

3. The system of claim 1, further comprising:
displaying comments with corrections required for the documents that relate to the required asset verification, income verification, and employment verification.

4. The system of claim 1, further comprising displaying via a graphical user interface a property address, move in date, move out date, associated with a specific property address and certification type.

5. The system of claim 1, wherein the third party verifications and the third party documentation are provided by employers of the tenant verifying employment of the tenant.

6. The system of claim 1, wherein the third party verifications and the third party documentation are provided by financial institutions associated with the tenant.

7. The system of claim 1, wherein the third party verifications and the third party documentation are provided by legal agents or representatives of the tenant.

8. The system of claim 1, further comprising, automatically time stamping any documents received from the tenant.

9. The system of claim 1, further comprising, automatically storing the completed set of documents, questionnaires, forms, or other items to be submitted for the type of certification by month, date, and/or year.

10. The system of claim 1, wherein the any household changes comprise information regarding an increase or decrease in a number of people in a household of the tenant, a change in income or financial status, a change in marital status, and/or a change in employment for the tenant.

11. The system of claim 1, further comprising, automatically and electronically notifying the tenant or another party of affidavits that need to be completed for the type of certification.

12. The system of claim 11, wherein the affidavits comprise affidavits related to income, assets, student status or information, credit, race, ethnicity, or household.

* * * * *